United States Patent [19]

Catania et al.

[11] Patent Number: 5,661,892
[45] Date of Patent: Sep. 2, 1997

[54] METHOD FOR POSITIONING TOOLING

[75] Inventors: Mark J. Catania, Tonawanda; Jeffrey P. Weaver, East Amherst; Thomas H. Rummell, Cheektowaga; Robert J. Kellner, Orchard Park, all of N.Y.

[73] Assignee: Gemcor Engineering Corp., Buffalo, N.Y.

[21] Appl. No.: 477,093

[22] Filed: Jun. 7, 1995

Related U.S. Application Data

[62] Division of Ser. No. 48,420, Apr. 14, 1993, Pat. No. 5,477,597.

[51] Int. Cl.$^6$ .............................. B23Q 17/00; B23B 35/00; B23C 3/00
[52] U.S. Cl. .................... 29/525.02; 408/1 R; 409/131
[58] Field of Search .................. 29/34 B, 33 R, 29/243.53, 33 K, 525.2; 409/202, 212, 211, 199, 131, 132; 408/1 R; 227/58, 51

[56] References Cited

U.S. PATENT DOCUMENTS

| | | | |
|---|---|---|---|
| 3,534,896 | 10/1970 | Speller et al. | 227/51 |
| 3,668,971 | 6/1972 | Dever | 409/202 X |
| 4,061,077 | 12/1977 | Gladwin | 409/199 |
| 4,583,891 | 4/1986 | Eschenfelder | 409/120 |
| 4,662,556 | 5/1987 | Gidlund | 227/69 |
| 4,752,160 | 6/1988 | Murray et al. | 409/216 X |
| 4,778,317 | 10/1988 | Earle, III et al. | 409/216 X |
| 4,864,702 | 9/1989 | Speller, Sr. et al. | 29/34 B |
| 4,955,119 | 9/1990 | Bonomi et al. | 29/264 X |
| 4,995,148 | 2/1991 | Bonomi et al. | 29/26 A |
| 5,033,174 | 7/1991 | Zieve | 29/34 B |
| 5,154,643 | 10/1992 | Catania et al. | 29/34 B |
| 5,163,793 | 11/1992 | Martinez | 409/212 X |
| 5,555,616 | 9/1996 | Michalewski et al. | 29/34 B |

*Primary Examiner*—William R. Briggs
*Attorney, Agent, or Firm*—Hodgson, Russ, Andrews, Woods & Goodyear LLP

[57] ABSTRACT

The present invention provides a method and apparatus for positioning tooling with respect to a curvilinear workpiece which is curved in a first direction extending along a plane substantially perpendicular to the longitudinal axis of the workpiece and which is curved in a second direction extending along a plane to the workpiece longitudinal axis, the degree of curvature in the first direction being greater than the degree of curvature in the second direction. An illustrative example is automatic drilling, inserting and upsetting one or two piece fasteners such as exterior skin rivets on an airplane fuselage. Inner and outer positioning systems carry or support inner and outer tooling, respectively, which engage the workpiece from opposite sides thereof during tooling operations thereon. Each of the inner and outer positioning systems move the respective tooling through a large number of axes, for example six axes of movement provided by the outer positioning system and seven axes of movement provided by the inner positioning system. Movements of the inner and outer positioning systems are controlled and co-ordinated by an adaptive, master-slave control system. A lateral trasfer system enables the appratus to operate successively on a plurality of workpieces.

23 Claims, 25 Drawing Sheets

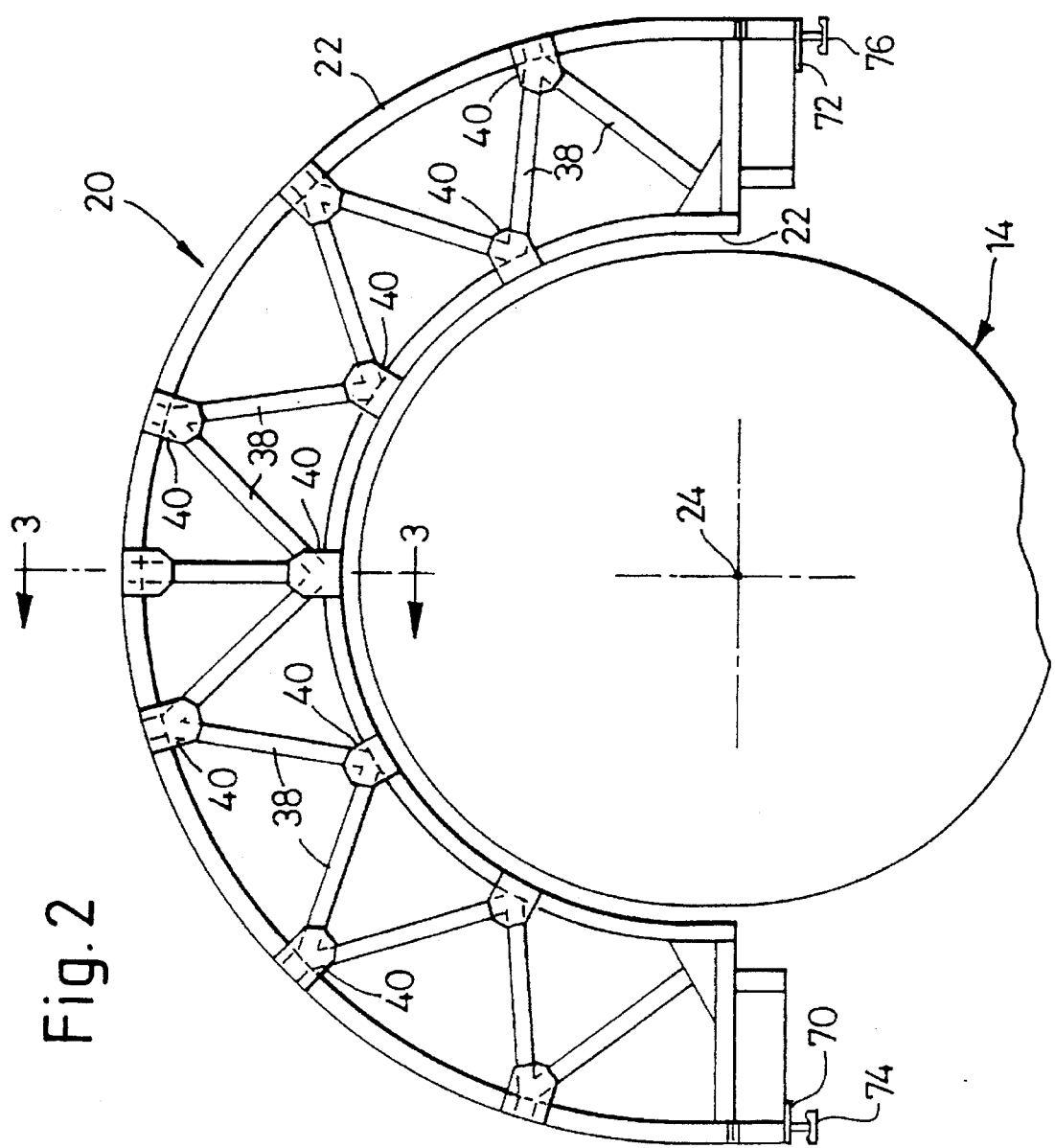

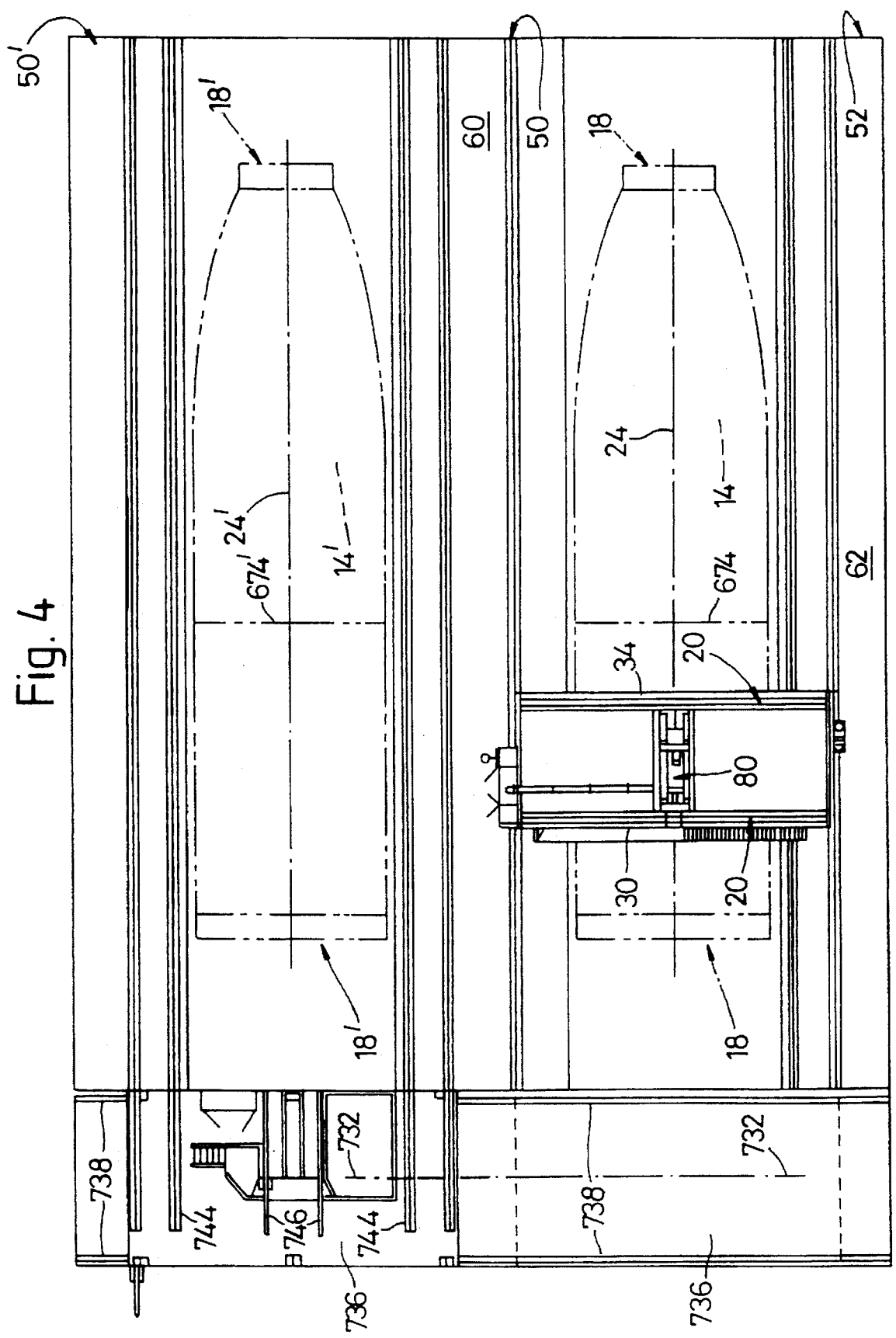

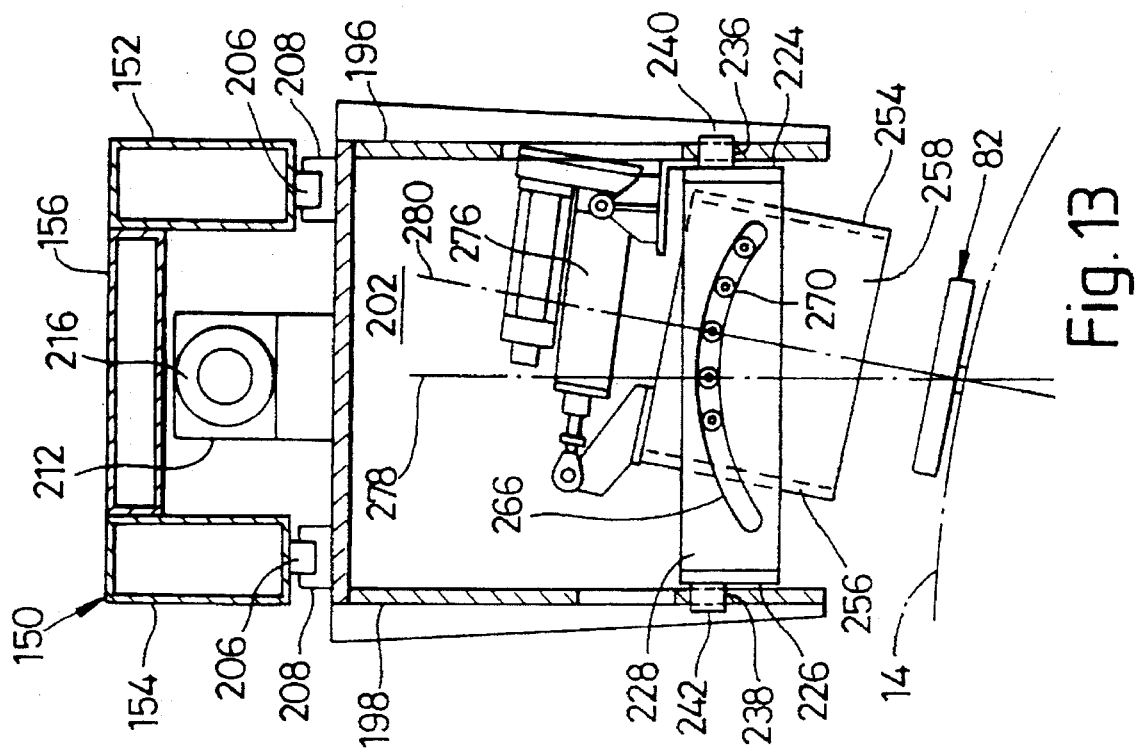
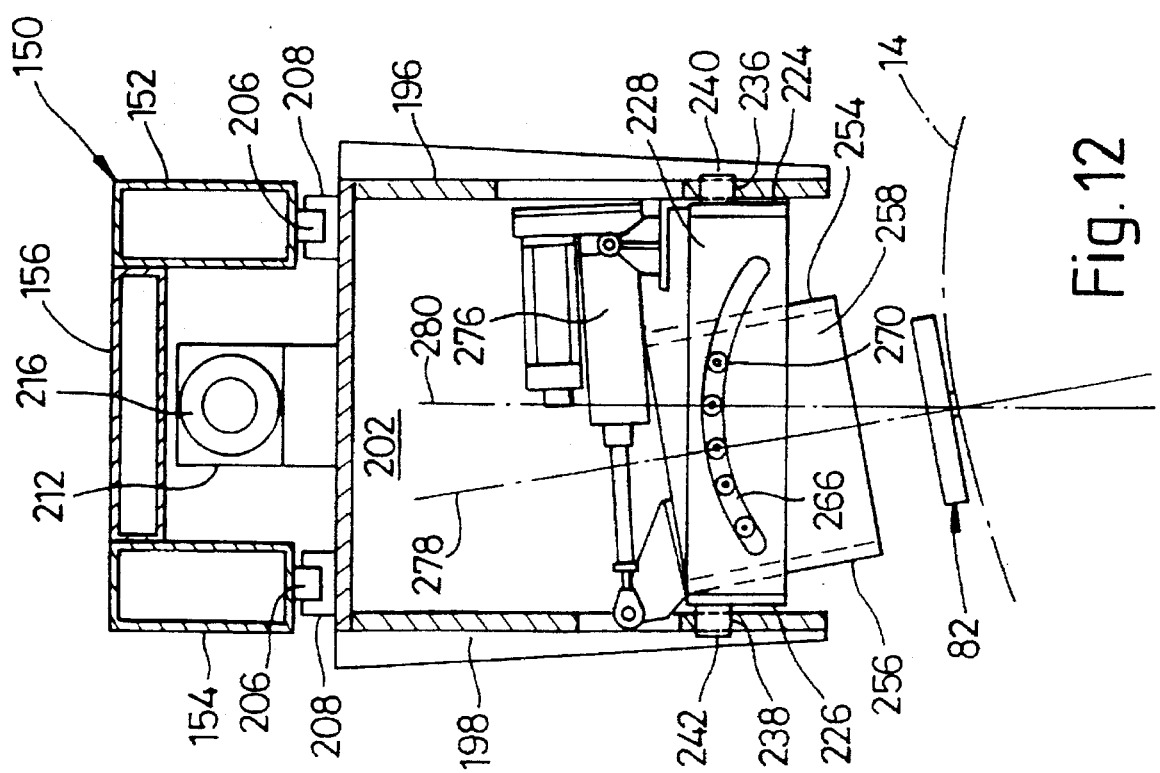

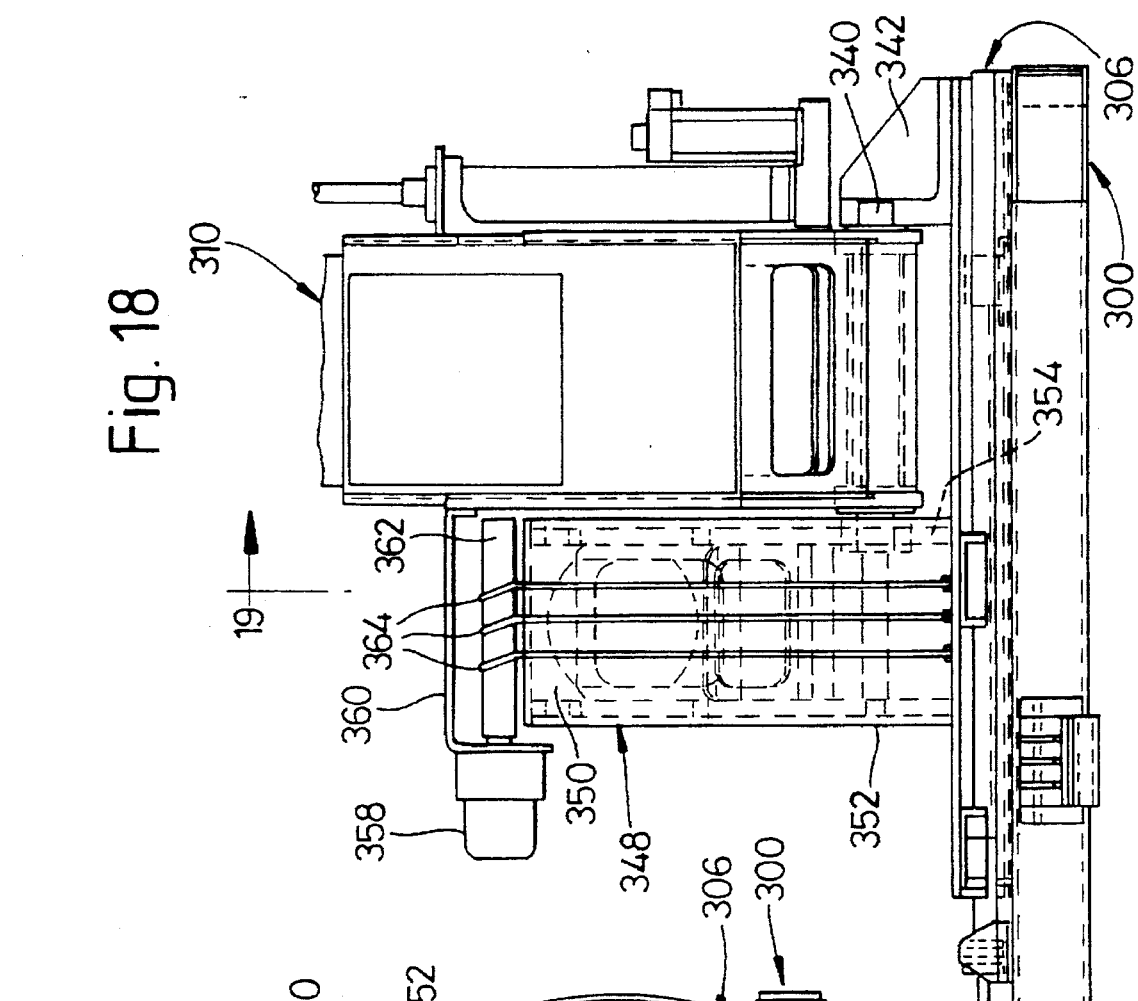
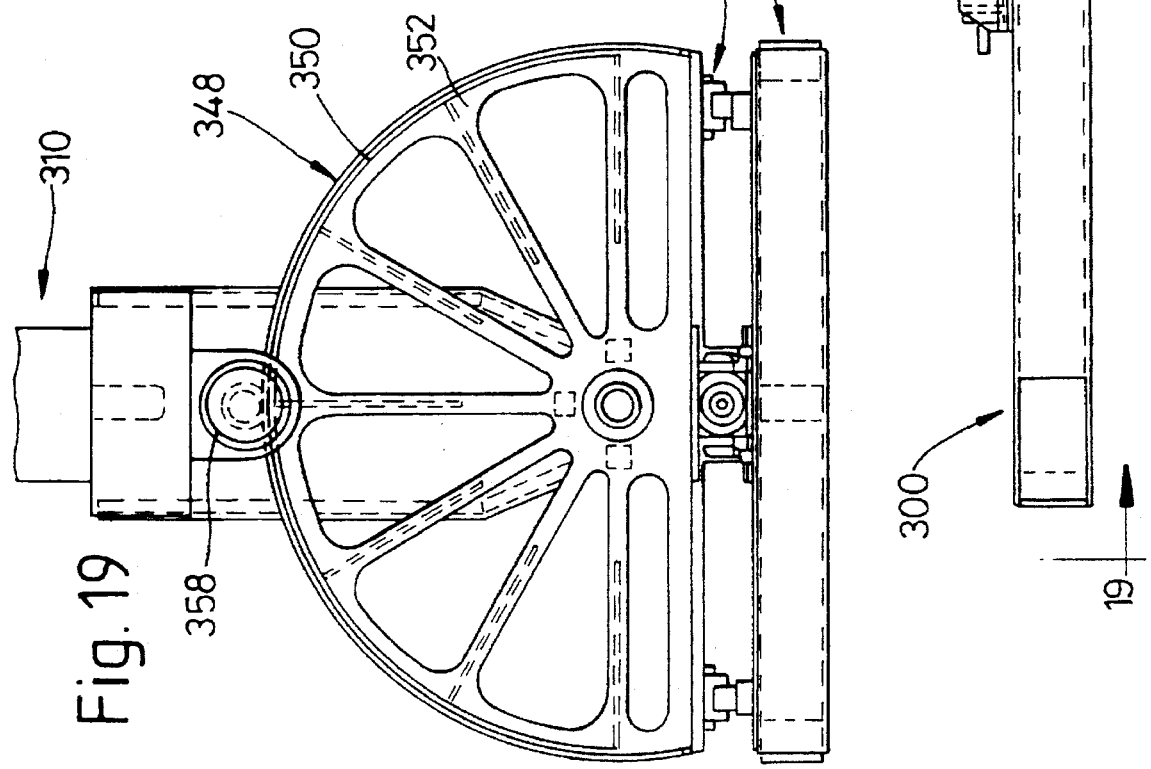

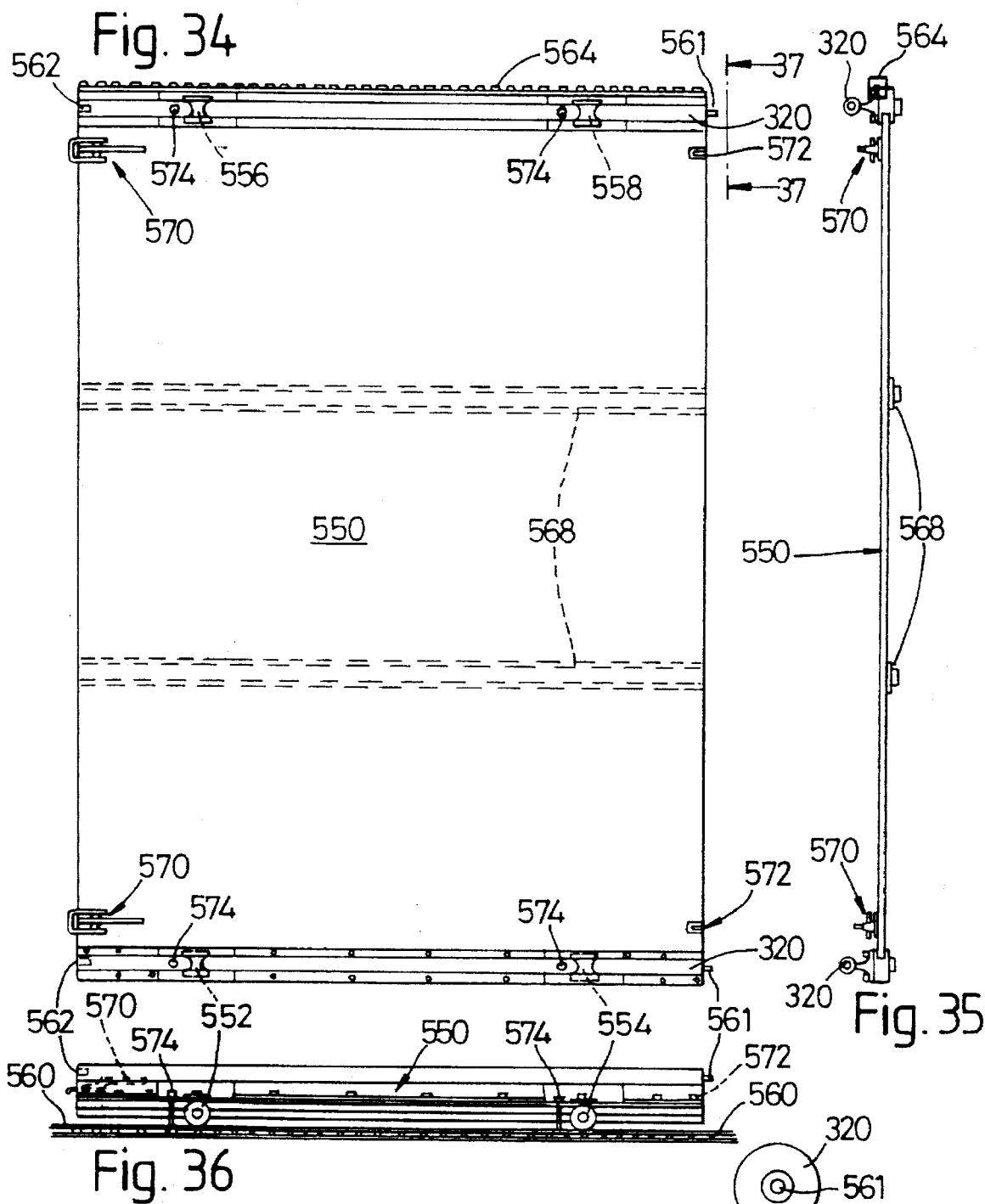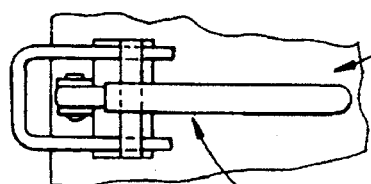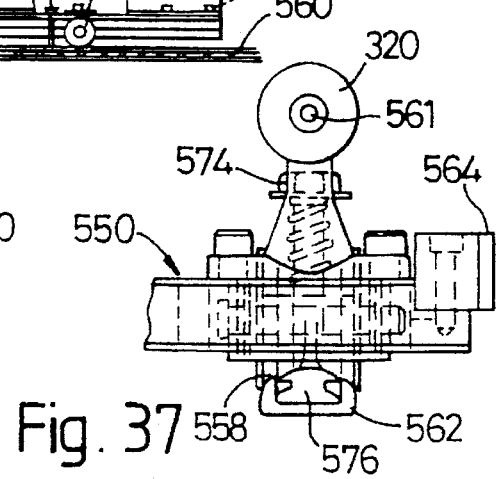

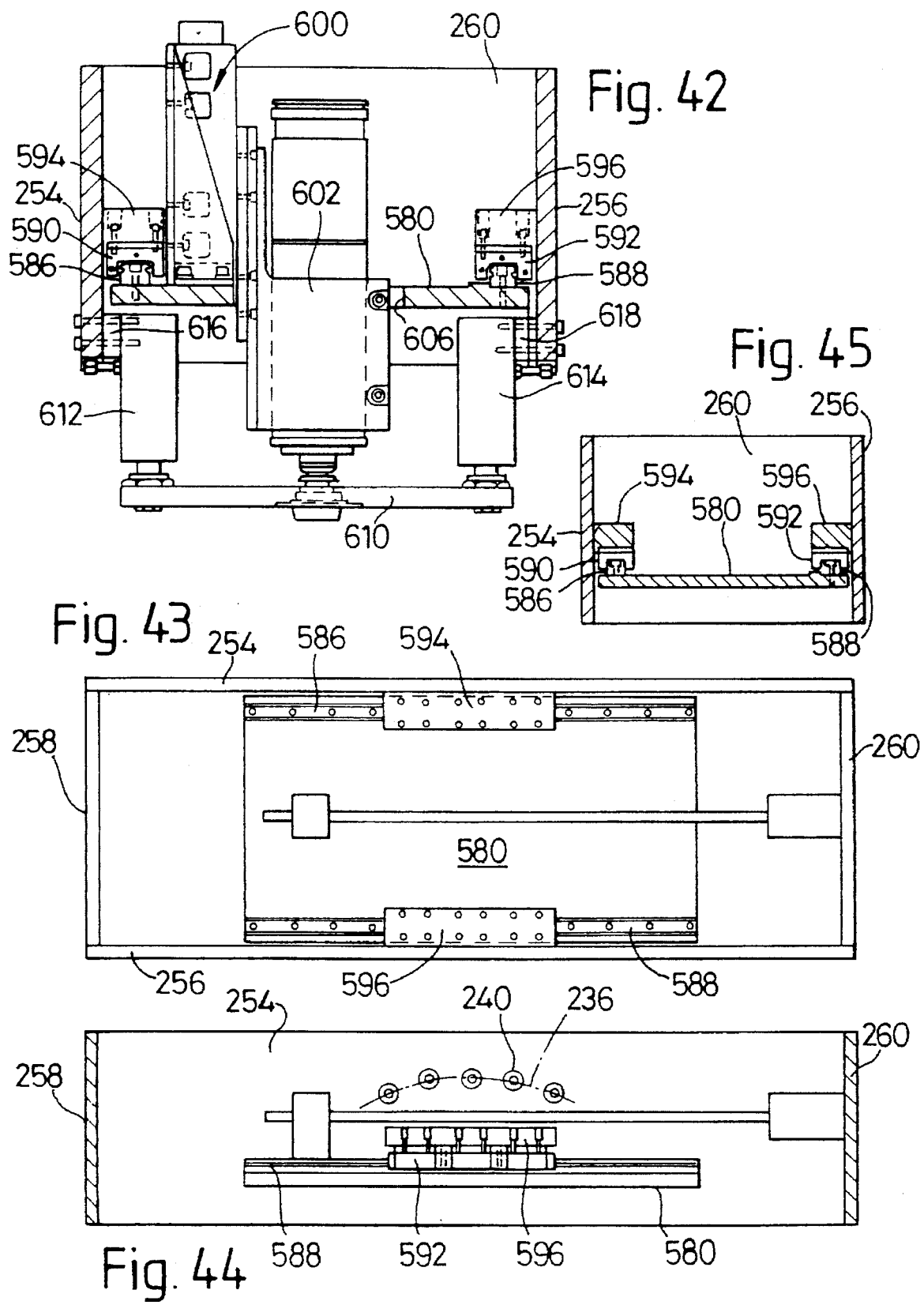

METHOD FOR POSITIONING TOOLING

This is a divisional of application Ser. No. 0/8 048,420 filed on Apr. 14, 1993, U.S. Pat. No. 5,477,597.

BACKGROUND OF THE INVENTION

This invention relates to the art of positioning tooling with respect to a workpiece, and more particularly to a new and improved method and apparatus for positioning tooling with respect to a curvilinear workpiece.

One area of use of the present invention is positioning tooling in the form of drilling and riveting tools with respect to a curvilinear workpiece in the form of an aircraft fuselage section, although the principles of the present invention can be variously applied. In the manufacture of aircraft, various systems have been utilized for assembling large curvilinear and cylindrical parts. Traditional manufacture has involved enormous manual effort and extensive fixturing of parts. Of particular interest in the area of use of the present invention are the skin lap splices and butt splices which are attached during a major join of an aircraft fuselage. These areas are inaccessable to conventional C-frame automatic fastening machines, and heretofore fasteners have been installed by manual methods.

It would, therefore, be highly desirable to provide a new and improved method and apparatus for positioning tooling with respect to a curvilinear workpiece and having application to automatically drilling, inserting and upsetting one or two-piece fasteners, for example exterior skin rivets on an airplane fuselage.

SUMMARY OF THE INVENTION

It is, therefore, a primary object of this invention to provide a new and improved method and appratus for positioning tooling with respect to a curvilinear workpiece.

It is a further object of this invention to provide such a method and apparatus for positioning tooling with respect to a curvilinear workpiece which is curved in a first direction extending along a plane substantially perpendicular to the longitudinal axis of the workpiece and which is curved in a second direction extending in a plane substantially parallel to the workpiece longitudinal axis, wherein the degree of curvature in the first direction is greater than the degree of curvature in the second direction.

It is a more particular object of this invention to provide such a method and apparatus having application to automatic drilling, inserting and upsetting one or two piece fasteners such as exterior skin rivets on an airplane fuselage.

It is a further object of this invention to provide such a method and apparatus having inner and outer positioning systems each providing movement of tooling through a relatively large number of axes.

It is a more particular object of this invention to provide such a method and apparatus wherein each of the inner and outer positioning systems achieves finite normalization of the tooling to the workpiece at all the curved surface portions thereof.

It is a more particular object of this invention to provide such a method and apparatus wherein the inner and outer systems, position the tooling in a manner reducing overall system vibration, enhancing cycle time and improving system accuracy.

It is a further object of this invention to provide such a method and apparatus for positioning tooling which is efficient and effective in operation and relatively simple in structure and function.

The present invention provides a method and apparatus for positioning tooling with respect to a curvilinear workpiece which is curved in a first direction extending along a plane substantially perpendicular to the longitudinal axis of the workpiece and which is curved in a second direction extending along a plane substantially parallel to the workpiece longitudinal axis, the degree of curvature in the first direction being greater than the degree of curvature in the second direction. An illustrative example is automatic drilling, inserting and upsetting one or two piece fasteners such as exterior skin rivets on an airplane fuselage. There is provided inner and outer positioning systems which carry or support inner and outer tooling, respectively, which engage the workpiece from opposite sides thereof during tooling operations thereon. Each of the inner and outer positioning systems move the respective tooling through a large number of axes, for example six axes of movement provided by the outer positioning system and seven axes of movement provided by the inner positioning system. Movements of the inner and outer positioning systems are controlled and co-ordinated by an adaptive, master-slave control system.

Briefly, the outer positioning means includes frame means for providing macro movement of the tooling in a direction parallel to the workpiece longitudinal axis which direction is designated the X axis. There is also provided means for moving the tooling along the frame parallel to the workpiece longitudinal axis in the form of micro movement in a direction designated the X-1 axis. The outer positioning means also includes means for moving the tooling along the arcuate or semi-circular contour of the workpiece which is along a path in a plane disposed substantially perpendicular to the workpiece longitudinal axis, this axis of movement being designated the a axis. There is also provided means for moving the tooling about the workpiece longitudinal axis at each location along the a axis to achieve finite normalization of the tooling to the workpiece surface, this axis of movement being designated the a-1 axis. The outer positioning means also includes means for moving the tooling toward and away from the workpiece, this axis of movement being designated the Z axis. There is also provided means for moving the tooling about an axis substantially perpendicular to the workpiece longitudinal axis during the z axis movement to achieve finite normalization of the tooling to the workpiece surface, this axis of movement being designated the b axis.

The inner positioning means includes, briefly, first carriage means supported on a surface spaced from the workpiece and movable longitudinally of the workpiece, second carriage means movable on the first carriage means, a telescopic arm assembly on the second carriage means and movable toward and away from the workpiece, and an assembly on the end of the arm means and having the tooling thereon. In the illustrative example of an airplane fuselage the outer positioning means faces the outer convex surface of the workpiece and the inner positioning means faces the concave inner surface of the workpiece. The first carriage means of the inner positioning means moves the tooling in a direction parallel to the workpiece longitudinal axis which is designated macro movement along the X axis. Movement of the second carriage means on the first carriage means in a direction parallel to the workpiece longitudinal axis is designated micro movement along the X-1 axis. There is provided means for moving the arm means to move the tooling along the arcuate or semi-circular contour of the workpiece which is a path disposed in a plane substantially perpendicular to the workpiece longitudinal axis, this axis of movement being designated the a axis. There is also provided means for moving the end of arm assembly and hence the tooling about the workpiece longitudinal axis at each location along the a axis to achieve finite normalization of the tooling relative to the workpiece surface, this axis of movement being designated the a-1 axis. The inner positioning means also includes means for moving the arm means to move the tooling toward and away from the workpiece, this axis of movement being designated the Z axis. There is also provided means for moving the end of arm assembly and hence the tooling about an axis substantially perpendicular to the workpiece longitudinal axis during the Z axis movement to achieve finite normalization of the tooling to the workpiece surface, this axis of movement being designated the b axis. There is also provided means for moving the end of arm assembly and hence the tooling about an axis substantially parallel to the longitudinal axis of the arm means, this axis being designated the c axis.

The foregoing and additional advantages and characterizing features of the present invention will become clearly apparent from a reading of the ensuing detailed description together with the included drawing wherein:

BRIEF DESCRIPTION OF THE DRAWING FIGURES

FIG. 2 is an enlarged end elevational view of the frame means of the outer positioning system of FIG. 1;

FIG. 3 is a sectional view with parts removed taken about on line 3—3 in FIG. 2;

FIG. 4 is a plan view of the arrangement of FIG. 1;

FIGS. 11, 12 and 13 are elevational views illustrating various positions of the head means during operation on the workpiece;

FIG. 18 is an enlarged fragmentary side elevational view of the arrangement for pivoting the arm means about the longitudinal axis of the first and second carriage means;

FIG. 19 is an end elevational view taken about on line 19—19 in FIG. 18;

FIG. 34 is a top plan view of a platform section for supporting the inner positioning system;

FIG. 35 is an end elevational view thereof;

FIG. 36 is a side elevational view thereof;

FIG. 37 is an enlarged fragmentary elevational view taken about on line 37—37 in FIG. 34;

FIG. 38 is an enlarged fragmentary plan view of a latch provided on the platform of FIG. 34;

FIG. 42 is an elevational view similar to FIG. 39 showing the tool thereof in a lowered working position;

FIG. 43 is a top plan view with parts removed of the head means of FIG. 39;

Figures 46, 47:
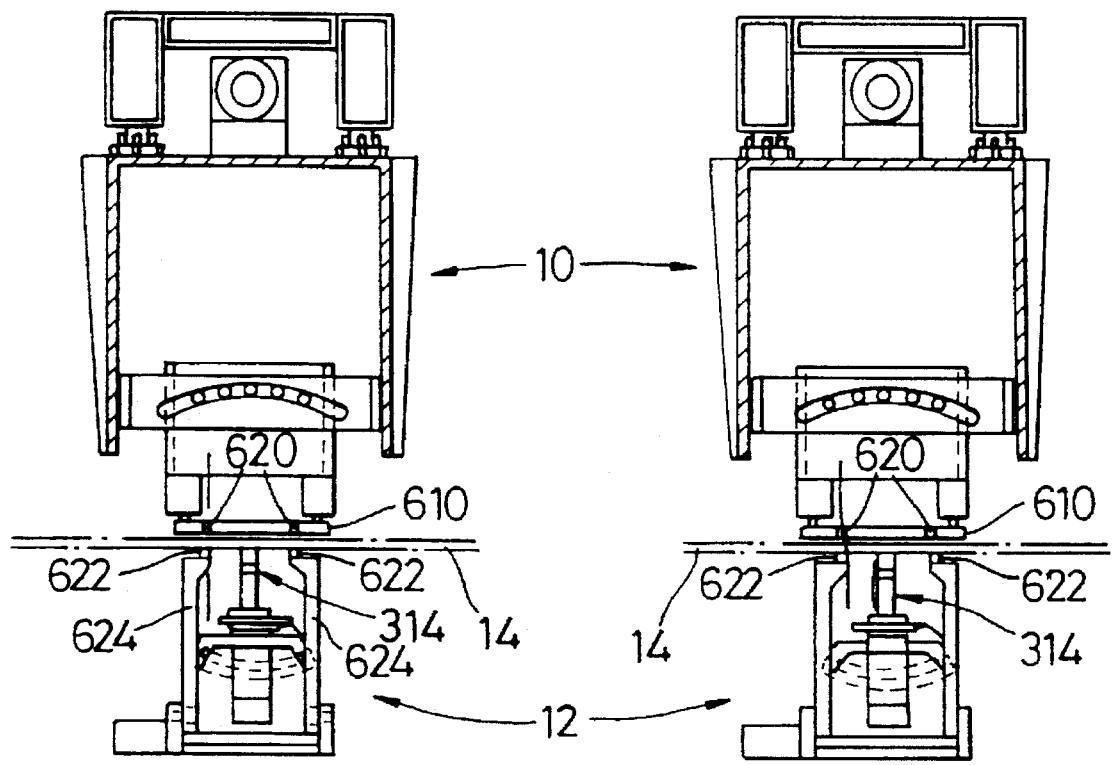
Figure 48:
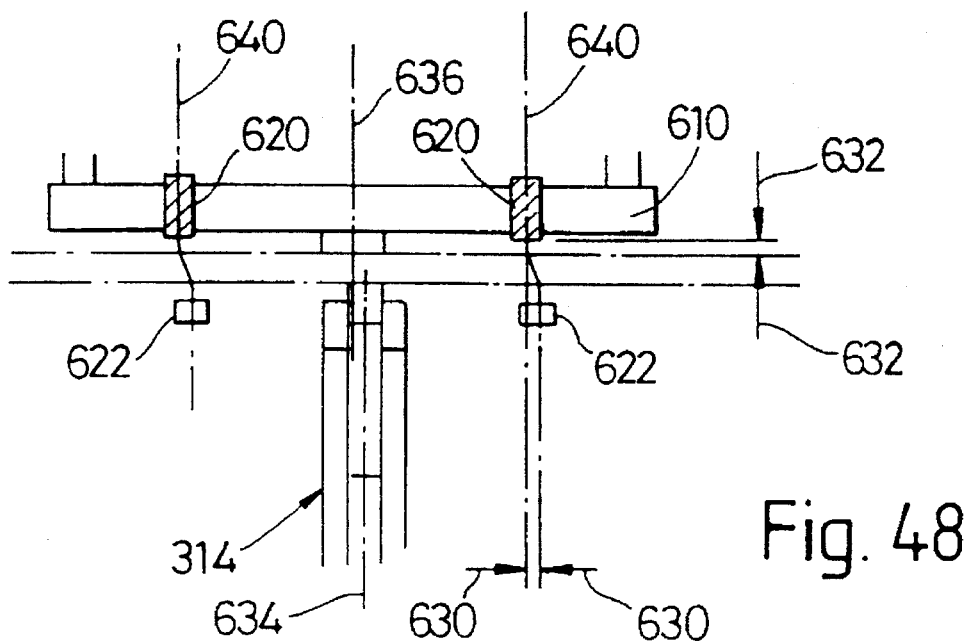

FIG. 44 s a side elevational view thereof, partly in section and with parts removed;

FIG. 45 is an end elevational view thereof, partly in section and with parts removed;

FIG. 46 is an elevational view, partly in section and with parts removed, and showing the inner and outer heads of the inner and outer positioning systems, respectively, in alignment on opposite sides of the workpiece;

FIG. 47 is a view similar to FIG. 46 showing the inner and outer heads slightly out of alignment;

FIG. 48 is a digrammatic view illustrating the condition of FIG. 47.

Figures 49, 50:
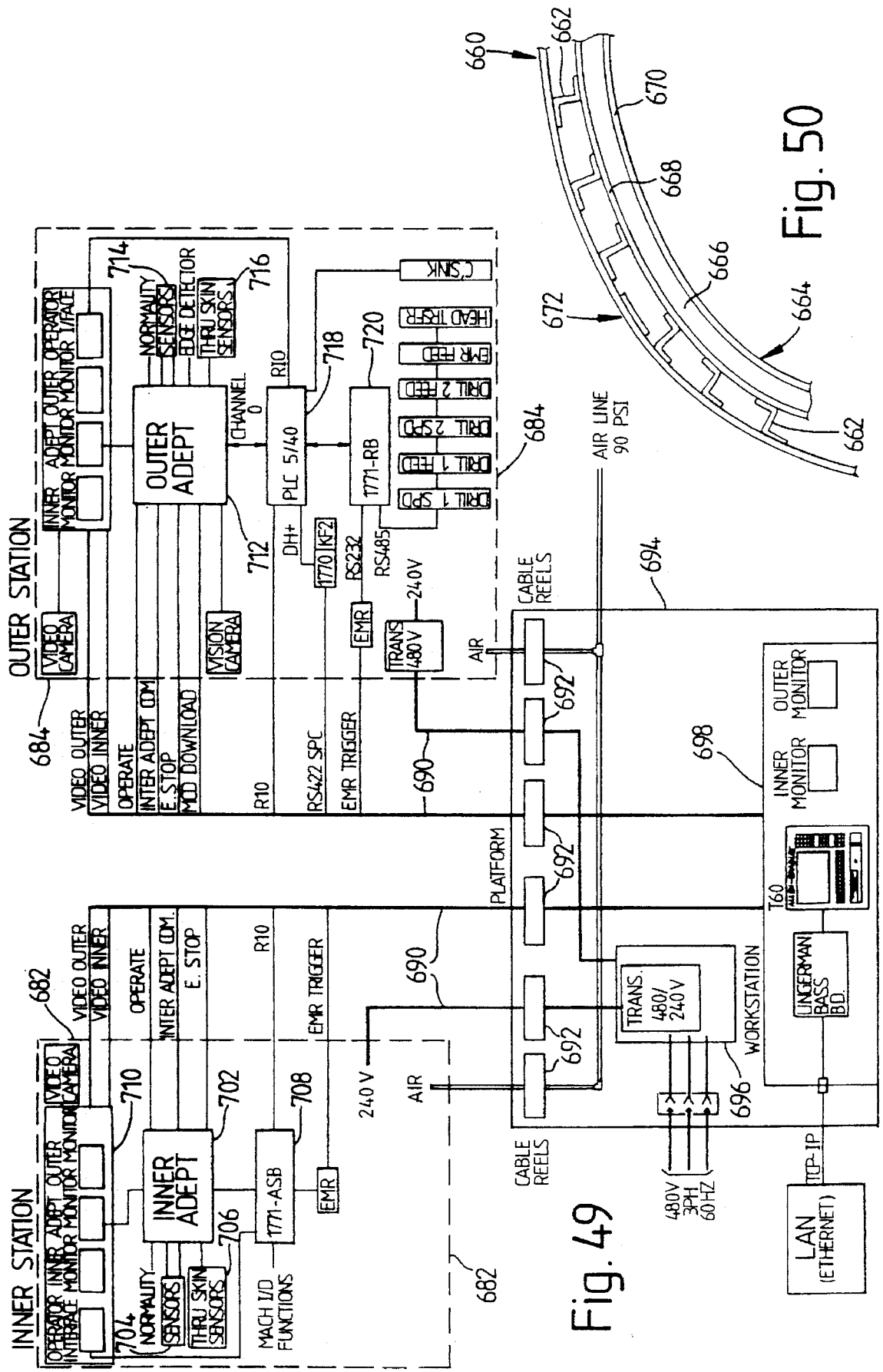

FIG. 49 is a schematic block diagram illustrating a control system for the inner and outer positioning systems of the present invention; and FIG. 50 is a diagrammatic view illustrating a structural characteristic of the workpiece utilized by the control system of FIG. 49.

DETAILED DESCRIPTION OF THE ILLUSTRATED EMBODIMENT

Figure 5:
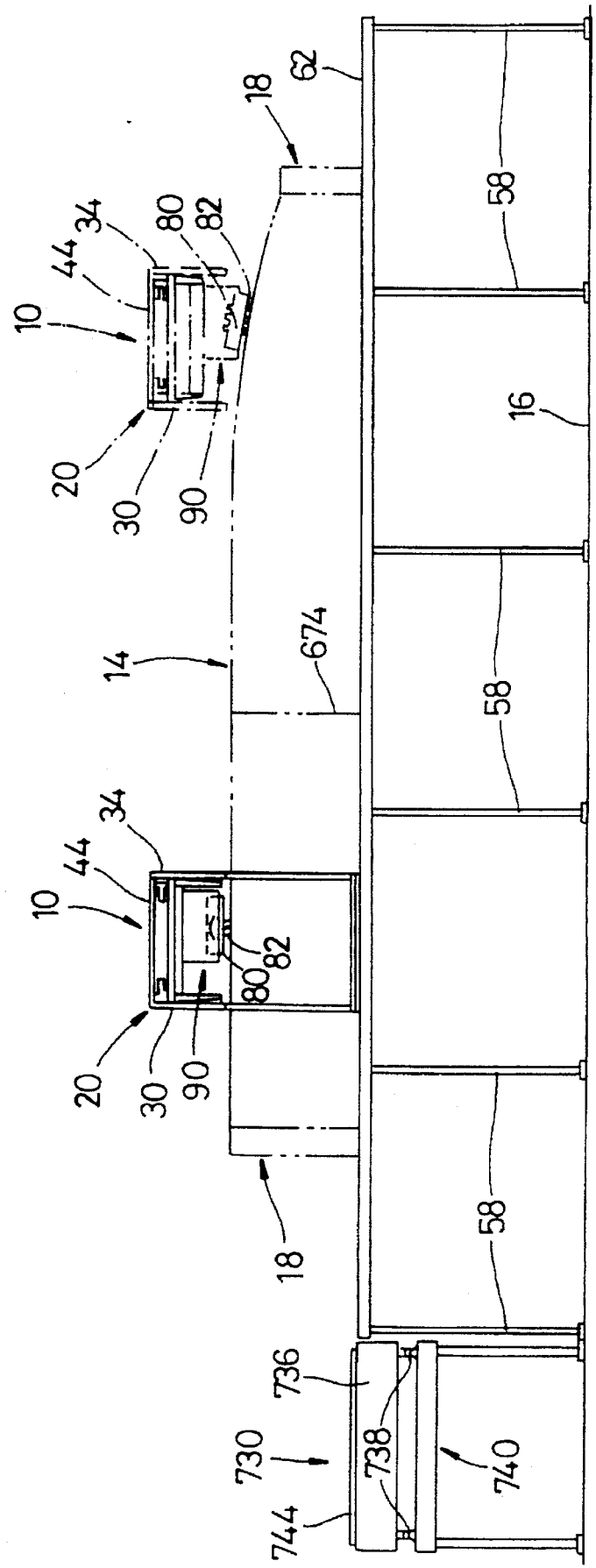
FIG. 5 is a side elevational view, partly diagrammatic, of the arrangement of FIG. 1.
Figure 6:
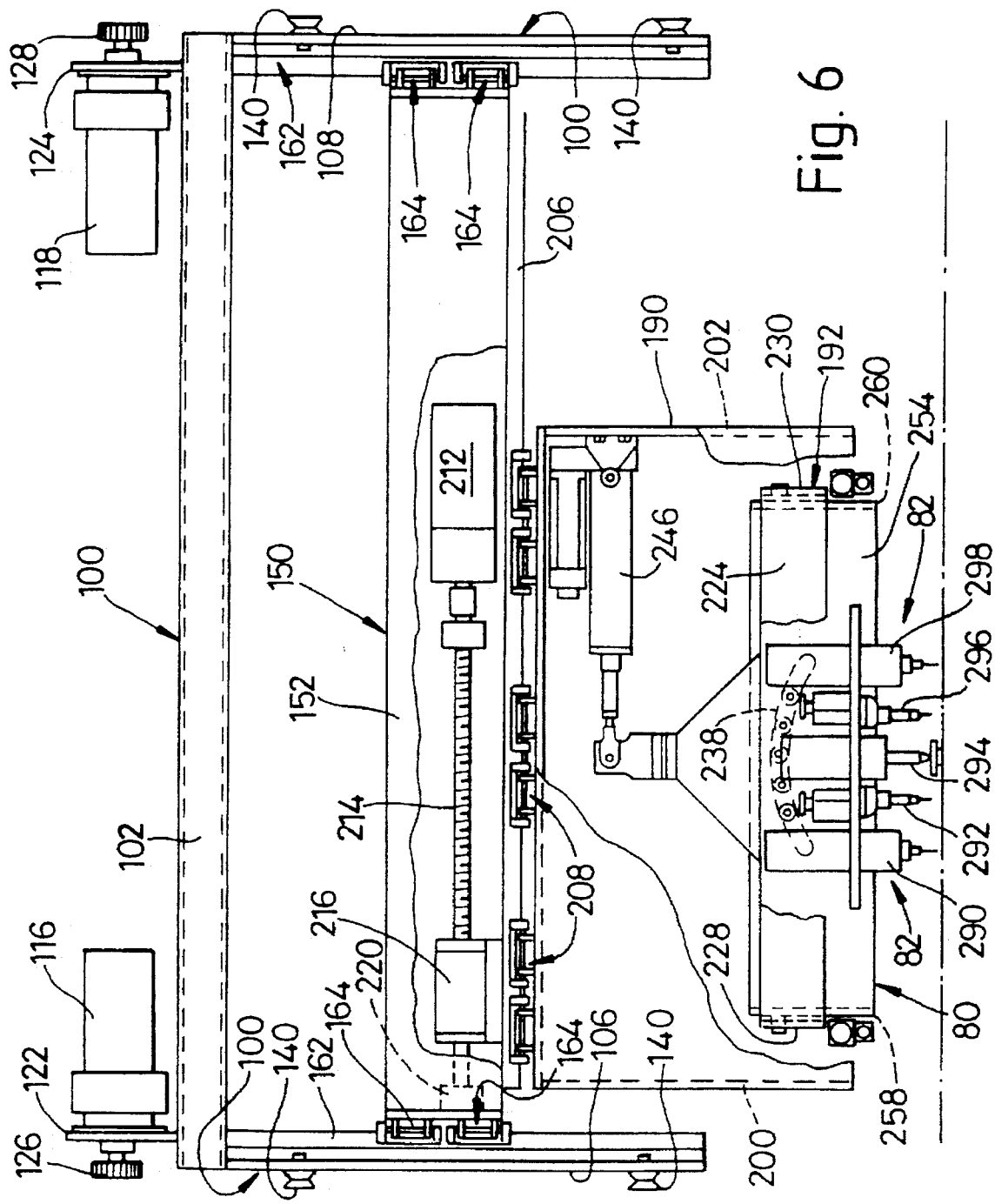
FIG. 6 is an enlarged elevational view with parts removed showing the inner frame and various carriages of the outer positioning system of FIG. 1.

Referring to FIGS. 1–5 the apparatus for positioning tooling according to the present invention includes an outer positioning system generally designated 10 and an inner positioning system generally designated 12, the terms inner and outer being in reference to opposite sides of a curvilinear workpiece generally designated 14. In the present illustration workpiece 14 is in the form of an airplane fuselage which is cylindrical in cross section as viewed in FIG. 1 and curvilinear in a longitudinal direction as seen in FIGS. 4 and 5. A typical manufacturing environment is illustrated wherein two fuselage workpieces 14 and 14' are located in close, side-to-side relation and supported above the ground or floor 16 by suitable fixture structures 17 and 17', respectively, in a known manner. The fuselage workpieces 14 and 14' are provided with end gates 18,18' at opposite ends thereof. Of particular interest are the skin lap splices and butt splices which are attached during a major join of each fuselage 14,14'.

The method and apparatus of the present invention as illustrated herein provides automatic drilling, inserting and upsetting of fasteners such as exterior skin rivets on an aircraft fuselage such as the illustrative workpieces 14,14'. The outer and inner positioning systems 10 and 12, respectively carry or support outer and inner tooling, respectively, which engage the workpiece 14 during the manufacturing, i.e. fastening, operation. The inner tooling typically can include a clamp sleeve and an inner riveting anvil as will be described in further detail presently. The outer tooling typically will include a pressure foot bushing, a drill spindle, an outer riveting anvil, a sealant dispenser and a second drill spindle as will be described in further detail presently.

Figure 1:
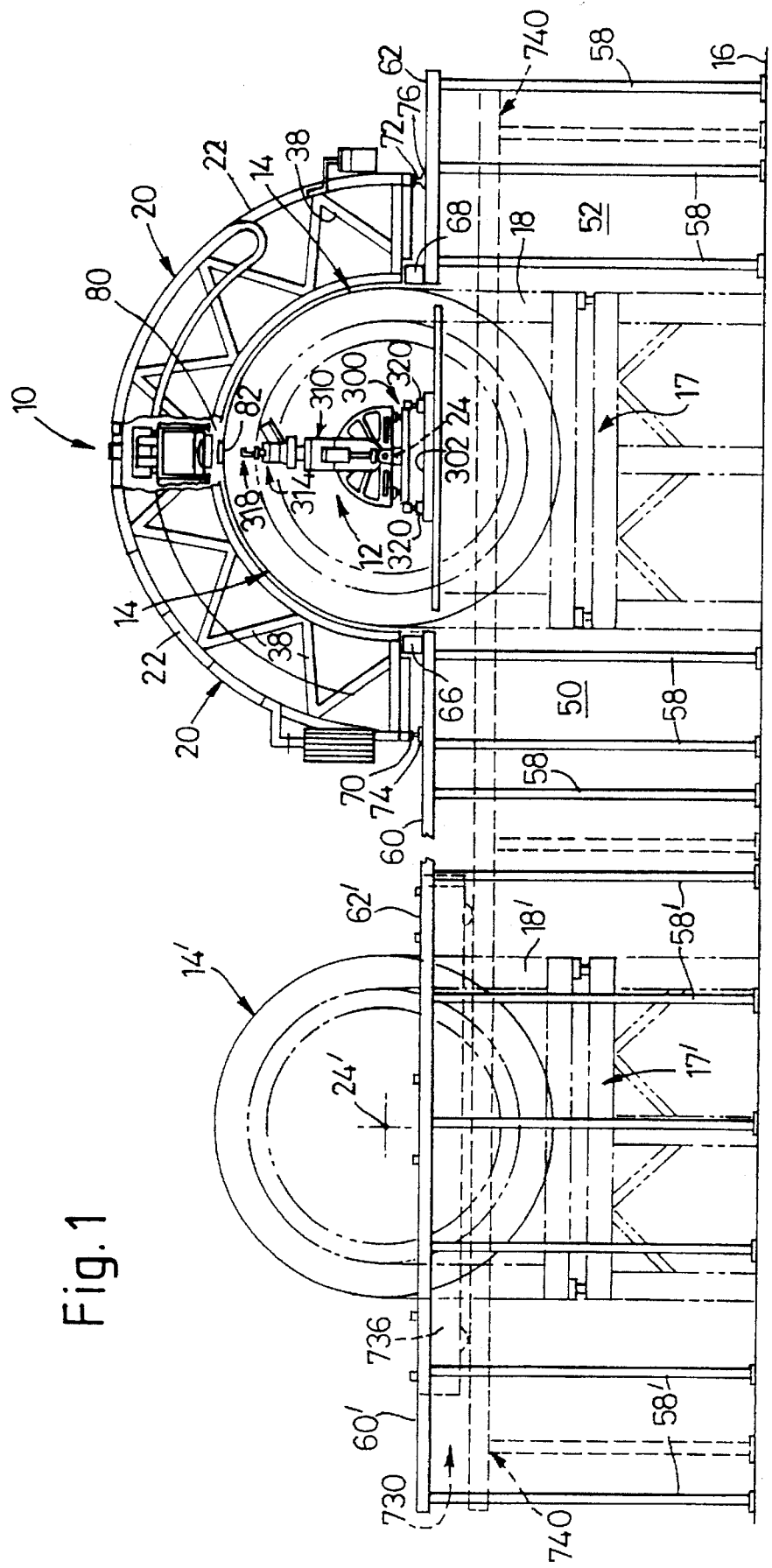
FIG. 1 is an end elevational view illustrating the inner and outer tooling positioning systems according to the present invention in operative positions on opposite sides of a workpiece.

For convenience, the outer and inner positioning systems will be described in detail separately. Turning first to the outer positioning system 10, it comprises frame means generally designated 20 having a first portion 22 substantially in the shape of a half-ring which extends about workpiece 14 in a direction substantially perpendicular to the longitudinal axis 24 of the workpiece as shown in FIGS. 2 and 3. Frame means 20 also has a second portion 26 in the form of a linear section which extends along workpiece 14 in a direction substantially parallel to the workpiece longitudinal axis. The first or ring-shaped portion 22 of frame means 20 is defined by an arrangement of a first pair of outer and inner half-ring frame members 30 and 32, respectively, and a second pair of identical outer and inner half-ring frame members 34 and 36, respectively. The inner frame members 32 and 36 are of an inner diameter slightly larger than the outer diameter of workpiece 14 at its largest cylindrical cross-section so that frame means 20 is freely axially movable along the entire length of the workpiece 14. The outer frame members 30 and 34 are joined to the inner frame members 32 and 36 by a truss-like arrangement of frame link members 38 as shown in FIGS. 1 and 2 secured together by means of brackets 40. The radial distance between the inner and outer frame members is sufficient to accommodate the outer positioning system 10 as will be apparent from the description to follow. The first and second pairs of half-ring frame members are spaced axially relative to the workpiece 14 by a series of frame spacer members 44 which are all of the same length and which are at circumferentially spaced locations along the arcuate path defined by the half-ring frame members. The length of each spacer member 44, which is equal to the axial spacing of the half-ring frame members, is also equal to the length of the second portion 26 of frame means 20. This length, in turn, may also be designated one frame bay for purposes of describing the operation of the apparatus of the present invention. The frame means 20 thus is of truss-like construction, and the frame members 30, 32, 34 and 36, the link members 38 and the spacer member 44 all can be of relatively light weight metal tubing.

In the illustrative arrangement shown, frame means 20 is supported relative to workpiece 14 by a pair of scaffold structures 50 and 52 located on opposite sides of workpiece 14 and each extending along workpiece 14 generally parallel to the longitudinal axis thereof as shown in FIGS. 1, 4 and 5. Scaffolds 50 and 52 include a series of vertically disposed legs 58 for supporting generally horizontally disposed platforms 60 and 62, on which the lower ends of frame means 20 are supported.

The apparatus of the present invention further comprises means for moving frame means 20 longitudinally along the workpiece 14. This can be accomplished in various ways, and in the present illustration a rack and pinion drive with linear bearings is provided between the lower ends of frame means 20 and the platforms 60 and 62. In particular, there is provided a pair of dual synchronized drives indicated diagrammatically at 66 and 68 in FIG. 1. Each of the drives, in turn, comprises a precision ground and hardened gear rack provided on the corresponding platform and an AC asynchronous servo motor driven pinion gear on frame means 20 engaging the rack. Outboard wheel assemblies 70 and 72 on frame 20 roll on aligned rail assemblies 74 and 76, respectively on platforms 60 and 62, respectively as shown in FIGS. 1 and 2. Synchronization of the drives is maintained by dual feedback for position verification of each drive through the use of encoders as is well understood by those skilled in the art. Thus, frame means 20 provides macro movement in a direction parallel to the longitudinal axis of workpiece 14, which direction is designated herein as to the X axis.

There is provided head means generally designated 80 in FIGS. 1 and 5 containing tooling generally designated 82 and movably carried by frame means 20. Head means 80, the manner in which it is movably carried by frame means 20 and the nature and operation of the tooling 82 all will be described in further detail presently.

In accordance with the present invention, there is provided means generally designated 90 in FIG. 5 for moving head means 80 along the second portion of frame means 20, i.e. along a path substantially between frame rings 30 and 34 as can be seen in FIG. 5, and in a direction substantially parallel to the longitudinal axis of workpiece 14, so that when frame means 20 is stationed at any location along the longitudinal axis of workpiece 14, the head means 80 and tooling 82 are moved along the afore-mentioned second portion of frame means 20 and therefore along a corresponding portion of the workpiece 14 in a direction substantially parallel to the longitudinal axis thereof. The provision of head moving means 90 eliminates the need to move the entire frame means 20 when indexing from one work location to another longitudinally along workpiece 14, i.e. indexing from rivet to rivet. Thus, head moving means 90 provides micro movement along an axis, herein designated the X-1 axis, within an entire frame bay which is the longitudinal dimension of frame means 20, i.e. the distance along the longitudinal axis of workpiece 14 spanned by the rings of frame means 20. In other words, as can be seen from FIG. 5, this allows frame means 20 to be parked at each frame bay location with all travel within the frame bay being along the X-1 axis as provided by head moving means 90. This, in turn, reduces overall vibration of the system, enhances cycle time because sensors in the system will not have to settle from system vibration due to motion of frame means 20, and improves system accuracy since a lighter load, i.e. not the entire frame means 20, is being indexed within the frame bay. The provision of head moving means 90 and its movement along the X-1 axis within the frame bay allows frame means 20 to have a wider profile, i.e. dimension parallel to the longitudinal axis of workpiece 14, which offers a more stable base thereby further enhancing reliability.

In the exemplary workplace of the present illustration, i.e. the aircraft fuselage 14, the workpiece is curved to a greater degree in a first direction extending along a plane substantially perpendicular to the longitudinal axis 24 as shown in FIG. 1, and the workpiece 14 is curved to a lesser degree in a second direction extending along a plane substantially parallel to the longitudinal axis 24 as shown in FIGS. 4 and 5. The outer positioning system 10 has six axes of movement to accommodate the curvature of workpiece 14. The first, designated herein the X axis as described above, is macro horizontal travel of frame means 20 in a direction parallel to the length or longitudinal axis 24 of workpiece 14 to span a frame bay. The second axis, designated herein the X-1 axis as described above, is finite or micro travel of the outer head means 80 within the frame bay. This X-1 axis also is parallel to the longitudinal axis 24 of workpiece 14.

At each location where frame means 20 is parked along workpiece 14 as described hereinabove, outer head means 80 moves along the arcuate or semi-circular contour of workpiece 14 as viewed in FIG. 1, this being along a path in a plane disposed substantially perpendicular to the longitudinal axis 24 of workpiece 14. In the present illustration where workpiece 14 is an aircraft fuselage, this is referred to as circumferential travel of outer head means 80 along the butt splice and also referred to as macro positioning. This is the third axis of movement and is designated herein the a axis. At each location of head means 80 during a axis movement, there is movement of head means about the longitudinal axis 24 of workpiece 14, and this provides finite normalization of head means 80 to the surface of workpiece 14 along the butt splice. This is the fourth axis of movement and is designated herein the a-1 axis.

During the macro travel of frame means 20 along workpiece 14 parallel to the longitudinal axis thereof, i.e. along the X axis, and during the finite travel of head means 80 within the frame bay defined by frame means 20, head means 80 is moved toward and away from workpiece 14 as illustrated, for example, in FIG. 5. This is the fifth axis of movement and is designated herein the Z axis. During such Z axis movement, head means 80 is moved in a direction substantially perpendicular to the surface of workpiece 14, and such perpendicularity of head means 80 is maintained by finite normalization of head means 80. Such finite normalization in turn, is achieved by movement of head means 80 about an axis substantially perpendicular to the longitudinal axis of workpiece 14. This is the sixth axis of movement and is designated herein the b axis.

Figure 7:
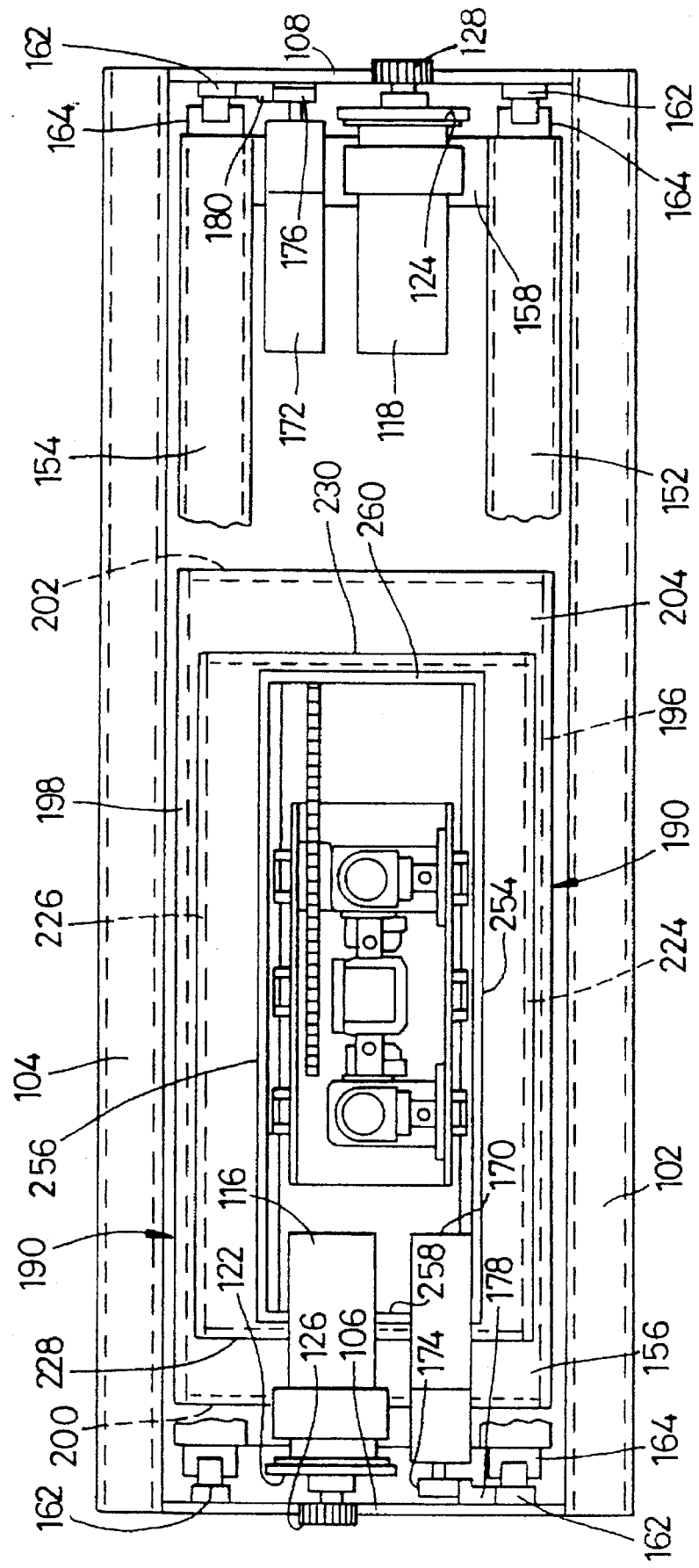
FIG. 7 is a plan view of the apparatus of FIG. 6.
Figure 8:
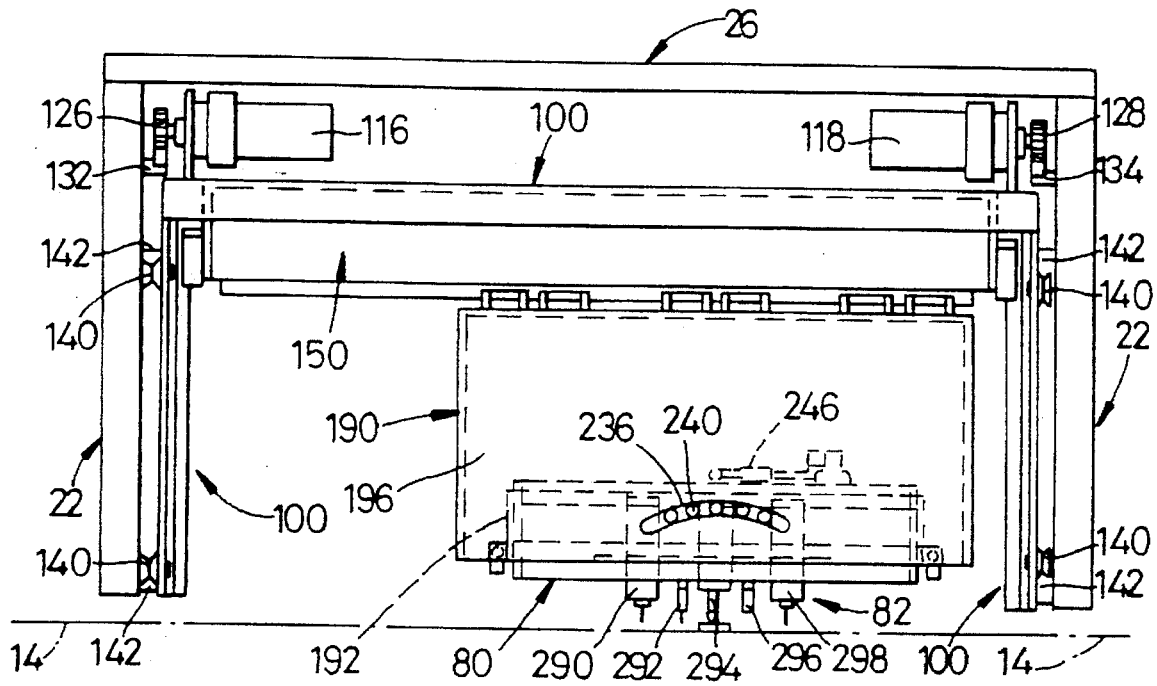
FIGS. 8, 9 and 10 are elevational views illustrating various positons of the Z-axis carriage and the box structures and head means carried thereby during operation on the workpiece.
Figure 9:
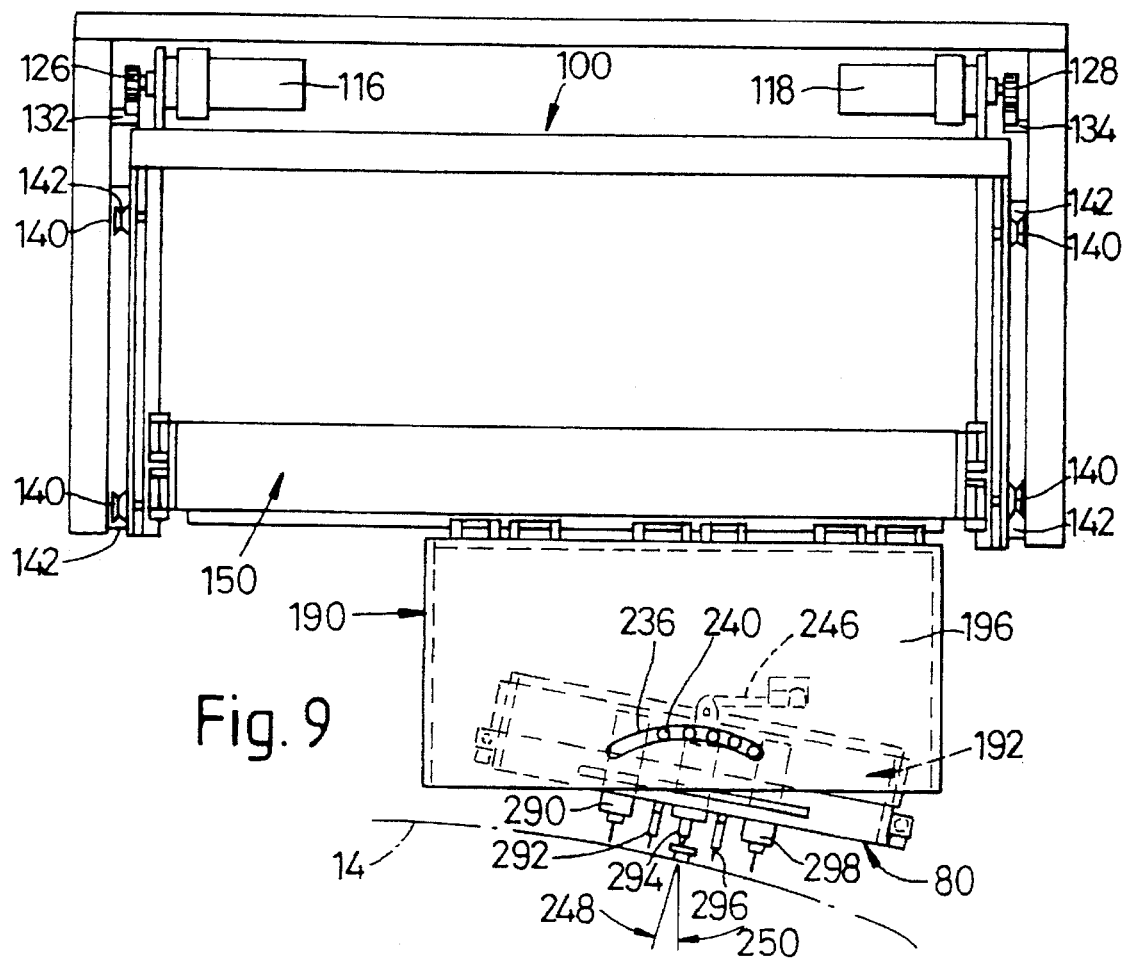
Figure 10:
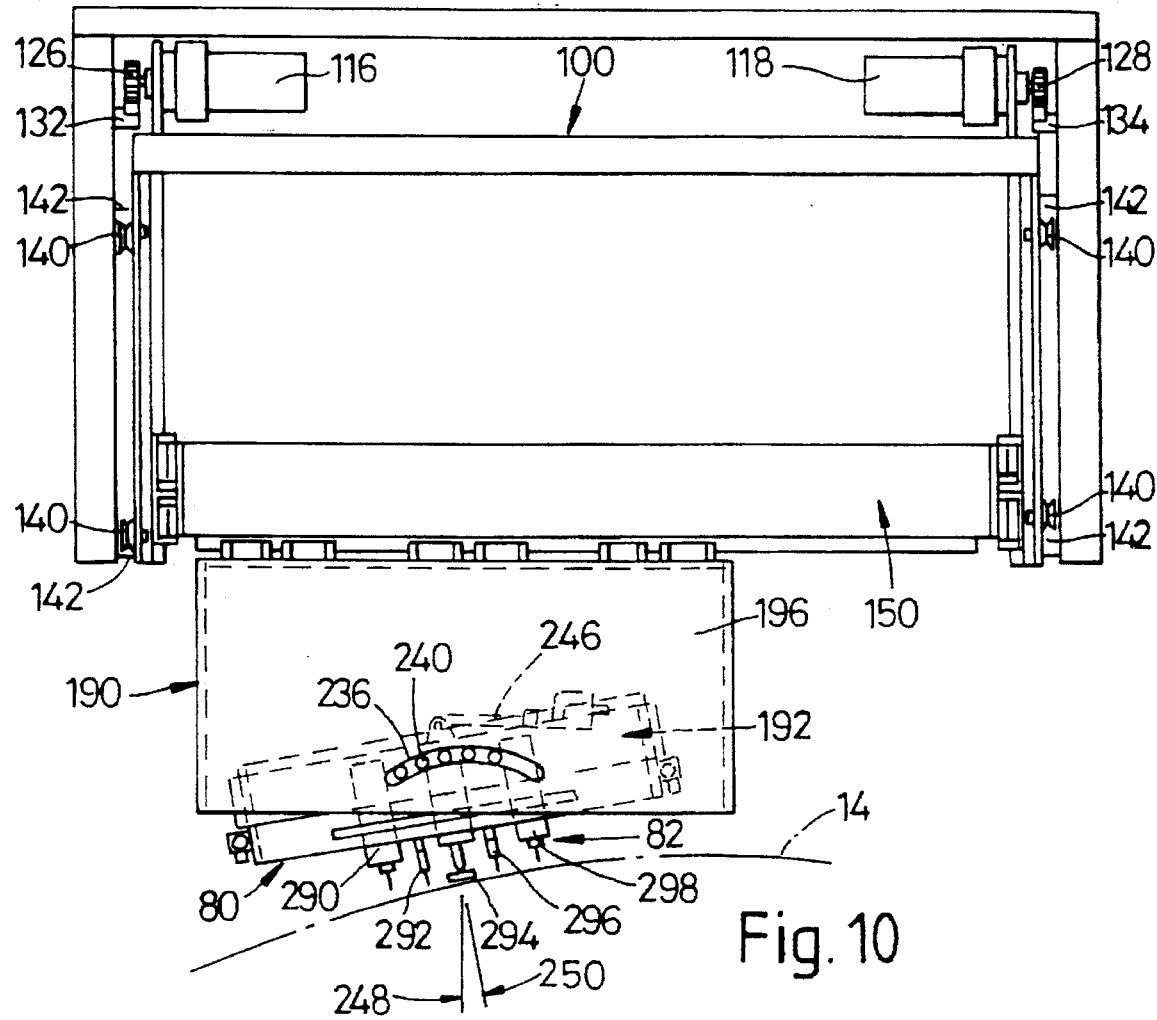

An illustrative arrangement for moving frame means 20 in the X direction, i.e. longitudinally along the workpiece, has been described and is shown in FIGS. 1 and 2. The structural arrangements for providing the foregoing movements in the X-1, Z, a, a-1 and b axes or directions are illustrated in FIGS. 6–13. For purposes of the description in connection with FIGS. 6–13, frame means 20 may be designated an outer frame means. There is provided an inner frame means 100 shown in FIGS. 6–10 which is movably carried by frame means 20 and adapted for movement along within the frame means 20 about workpiece 14 as viewed in FIG. 1 along an arcuate path which is disposed in a plane substantially perpendicular to the longitudinal axis 24 of workpiece 14. Thus, frame means 100 is designated also the a-axis frame, and it carries therein the head means 80 and tooling 82 along with other components which will be described. As shown in FIGS. 8–10, inner frame means 100 is contained within the spaced-apart half ring portions 22 of frame means 20 and also within, i.e. below, the linear section 26 of frame means 20. Frame means 100 includes a longitudinally extending portion comprising a pair of spaced parallel frame members 102,104 shown in FIGS. 6 and 7 which are disposed substantially parallel to the longitudinal axis 24 of workpiece 14. Frame means 100 also includes a pair of spaced-apart end frame members 106,108 depending from opposite longitudinal ends of frame member 102,104. Frame members 106,108 are disposed in planes substantially perpendicular to the longitudinal axis 24 of workpiece 14.

There is provided means for moving inner frame means 100 along within frame means 20 about workpiece 14 as viewed in FIG. 1 along an arcuate path which is disposed in a plane substantially perpendicular to the longitudinal axis 24 of workpiece 14. In particular, in the illustrative arrangement shown, a pair of a-axis drive motors 116,118 are located above frame members 102,104 as shown in FIGS. 6–10 and mounted to frame means 100 by brackets 122,124. Motors 116 and 118 have gear reducers associated therewith in a known manner, and each motor/gear reducer combination 116 and 118 drives a gear 126 and 128, respectively. Gears 126 and 128, in turn, engage arcuate rack segments 132 and 134, respectively, on frame means 20 as shown in FIGS. 8–10. The rack segments 132 and 134 extend along the above-mentioned arcuate path and with gears 126,128 driven by motors 116,118 provide the a-axis drive. Frame means 100 is guided along the afore-mentioned path within frame 20 by engagement between V-grooved cam followers or rollers 140 provided on frame members 106,108 and co-operating cam tracks 142 provided on frame 20 and extending along the afore-mentioned arcuate path. The positional location of inner frame means 100 within outer frame means 20 along the path of travel in the a-axis direction is determined by a suitable encoder arrangement (not shown) in a known manner.

As previously mentioned, inner frame means 100 carries therein the head means 80 and tooling 82 along with other components. One of those other components is a carriage means generally designated 150 in FIGS. 6–10 which also is referred to herein as the Z axis carriage. Carriage means 150 comprises a pair of spaced-apart parallel carriage frame members 152 and 154 each of hollow rectangular cross section as shown in FIGS. 6–13 and each extending in a direction substantially parallel to the longitudinal axis 24 of workpiece 14. The longitudinally extending carriage members 152,154 are joined by a pair of end members 156 and 158 as shown in FIGS. 7 and 11–13 which extend substantially at right angles to carriage members 152,154. The Z-axis carriage means 150 is moved toward and away from workpiece 14 to provide corresponding movement of head means 80 toward and away from workpiece 14 in a manner which will be decribed. Carriage means 150 moves within inner frame 100, being guided by precision linear ways 162 mounted on the end frame members 106,108 which receive linear bearings 164 mounted on Z-axis carriage members 152,154 in a known manner and as shown in FIGS. 6–10. The linear ways 164 are disposed with the longitudinal axes thereof parallel to the desired direction of movement of Z-axis carriage means 150 toward and away from workpiece 14. The carriage means 150 is moved by a rack and pinion drive arrangement comprising a pair of motor-gear box combinations 170 and 172 mounted on carriage end members 156 and 158, respectively, as shown in FIG. 7, which drive gears 174 and 176 which, in turn, engage racks 178 and 180, respectively mounted on the inner frame end members 106 and 108, respectively. Alternatively, a ball screw drive arrangement could be employed. Thus, the inner frame means 100 carrying the Z-axis carriage means 150 is indexed about the circumference of workpiece 14 by the a-axis drive previously described, and at each of those locations about the circumference of workpiece 14 the Z-axis carriage means 150 is indexed to the workline, i.e. moved toward workpiece 14, on the precision rack and pinion drives 174, 176 and 178, 180 powered by the motor-gearbox combination 170 and 172. The motor-gearbox combinations 170,172 comprise synchronized dual AC asynchronous servo motors with gearboxes in a known manner. The location of Z-axis carriage means 150 at any position during the movement toward and away from workpiece 14 is determined by a suitable encoder arrangement in a known manner.

The Z-axis carriage means carries a three part structural combination toward and away from workpiece 14, and that three part combination includes, briefly, an outer rectangular-shaped box structure 190, an intermediate rectangular-shaped box structure 192 carried within box 190 and an inner rectangular-shaped box structure which is the head means 80 and which is carried within box 192. In addition, the outer box structure 190 is moved along the X-1 axis direction, the intermediate box 192 is moved about the b axis and the inner box or head means 80 is moved about the a-1 axis, all of which will be described in detail presently.

The outer box structure 190, also referred to herein as the Z-axis box, comprises a pair of spaced-apart side walls 196,198, a pair of spaced-apart end walls 200,202 and a top wall 204 as viewed in FIGS. 6–10. Movement of box 190 in the direction of the X-1 axis is guided by an arrangement of a pair of linear guide ways 206 on Z-axis carriage members 152,154 which guides 206 receive linear bearings 208 mounted on top wall 204 of box 190 in a known manner. The linear ways 206 are disposed with the longitudinal axes thereof parallel to the X-1 axis direction. The Z-axis box 190 is moved along the X-1 axis by an X-1 axis drive motor/gearbox combination 212 shown in FIG. 6 mounted by suitable means (not shown) to Z-axis carriage 150 and drivingly connected to a ball screw 214 operatively threaded in a ball nut component 216 fixed by suitable means (not shown) to box structure 190, in particular to top wall 204 thereof. The opposite end of ball screw 214 is supported in a bearing 220 mounted by suitable means (not shown) to Z-axis carriage. The X-1 axis drive motor/gearbox combination 212 includes an a.c. asynchronous servo motor, and position location of Z-axis box 190 within the X-1 axis travel envelope is obtained by a suitable encoder arrangement (not shown) in a known manner.

The intermediate box structure 192 comprises a pair of spaced-apart side walls 224,226 and a pair of spaced-apart end walls 228 and 230. Box 192 is positioned in the Z-axis box 190 near the open lower end thereof as viewed in FIGS. 6–13. Movement of box 192 in the direction of the b axis is guided by arcuate cam tracks 236 and 238 shown in FIGS. 8–13 provided in the sidewalls 196 and 198, respectively, of Z-axis box 190 which cam tracks receive arcuate sets of cam rollers 240 and 242, respectively, rotatably mounted on the side walls 224 and 226, respectively, of box structure 192. The intermediate box structure 192 is moved by operation of an electrically operated servo linear actuator 246 shown in FIGS. 8–10 connected at one end to a wall of Z-axis box 190 and connected at the opposite end thereof to a mid-point along the length of intermediate box 192. According to a preferred mode of the present invention, cam tracks 236, 238, cam rollers 240,242 and linear actuator 246 co-operate to provide about ±10 degrees of rotation of intermediate box structure 192 about the b axis as indicated by arrows 248, 250 in FIGS. 9 and 10. The radius of each arcuate track 236, 238 is centered at the workpoint on workpiece 14.

Figure 11:
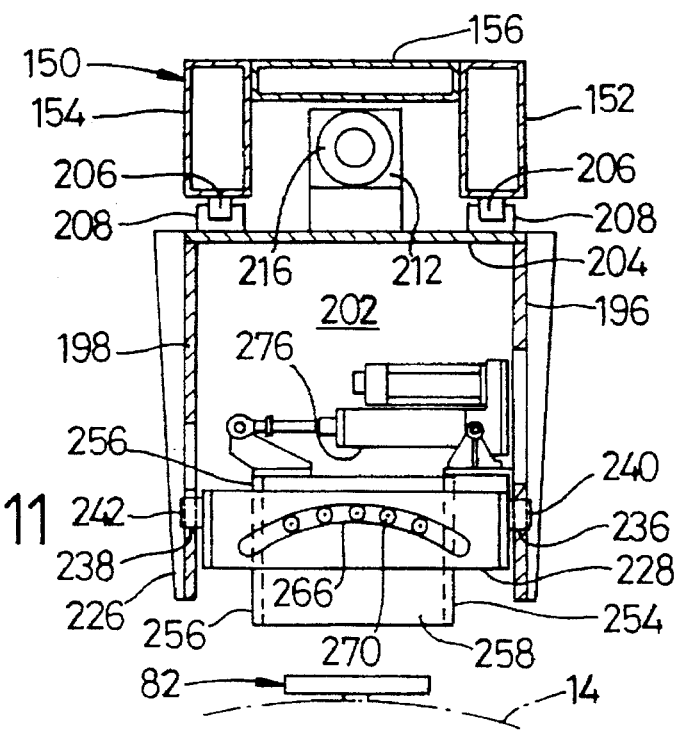

The inner box structure or head means 80 comprises a pair of spaced-apart side walls 254,256 and a pair of spaced-apart end walls 258,260 as shown in FIGS. 6, 7 and 11–13. Head means 80 is positioned within the intermediate box 192 and has an outer length slightly less than the inner lengthwise dimension of intermediate box 192. The width of head means 80 is significantly less than the inner width of box 192 to accommodate a-1 axis movement in a manner which will be described. Movement of head means 80 in the direction of the a-1 axis is guided by arcuate cam tracks 266 and 268 shown in FIGS. 11–13 provided in the end walls 228 and 230, respectively, of intermediate box 192 which cam tracks receive arcuate sets of cam rollers 270 and 272, respectively, rotatably mounted on the end walls 258 and 260, respectively, of head means 80. Head means 80 is moved by operation of a pair of electrically operated servo linear actuators 276 connected at each end to side wall 224 of intermediate box 192 and connected at the other end to end walls 258,260 of head means 80 as shown in FIGS. 11–13. According to a preferred mode of the present invention, cam tracks 266,268, cam rollers 270 and 272 and linear actuator 276 co-operate to provide about ±10 degrees of rotation of head means 80 about the a-1 axis as indicated by lines 278,280 in FIGS. 12 and 13. The radius of each arcuate track 266, 268 is centered at the workpoint on workpiece 14.

The various positions of the outer box structure 190, and with it the head means 80, along the X-1 axis are seen in FIGS. 6 and 8–10. Movement of Z-axis carriage means 150, and with it the head means 80, toward and away from workpiece 14 is illustrated in FIGS. 6 and 8–10. FIG. 8 illustrates operation at a location along workpiece 14 where the degree of curvature thereof in the longitudinal direction is very slight if any at all. Accordingly, little if any movement of intermediate box 192 about the b axis occurs. FIGS. 9 and 10, on the other hand, illustrate operation at locations along workpiece 14 having a significant degree of curvature in a longitudinal direction. Here, as shown in FIGS. 9 and 10, intermediate box 192, and with it head means 80, is moved about the b axis to maintain normality between head means 80 and the work axis. FIGS. 11–13 illustrate operation at locations about the workpiece, i.e. about the circumference thereof as viewed in FIG. 1, along the path of movement in the a axis direction. FIG. 11 illustrates operation at a location wherein the degree of curvature of workpiece 14 in the a axis direction is such that no movement of head means 80 about the a-1 axis is required. FIGS. 12 and 13, however, illustrate operation at locations about workpiece 14 along the a axis direction where the degree of curvature of workpiece 14 is significant. Here, head means 80 is moved about the a-1 axis to maintain normality with the work axis.

In the illustrative application wherein the workpiece 14 is an airplane fuselage having sections to be fastened or riveted together, a preferred arrangement of tooling 82 is a first drill 290, a probe device 292 for inspecting the hole drilled, a pneumatic or electromagnetic riveting tool 294, a second probe device 296 and a second drill 298. The five tools 290, 292, 294, 296 and 298 are in spaced relation along a line and moved into and out of alignment with a work axis by a transfer mechanism and arrangement which will be described in detail presently. This arrangement, which places the riveting tool 294 in the center position of the five position in-line transfer arrangement, allows for the transfer of the tools of head means 82 from two directions to accommodate different drill sizes and to minimize the transfer distance.

Turning now to the inner positioning system 12 it includes first carriage means generally designated 300 in FIGS. 14–18 which is supported on a surface 302 spaced from workpiece 14 as shown in FIG. 1. Whereas the outer positioning system 10 faces the convex outer surface of workpiece 14, the inner positioning system faces the concave inner surface of workpiece 14 and is adapted for movement along surface 302 in a direction along, i.e. substantially parallel to, the longitudinal axis of workpiece 14. In the present illustration wherein workpiece 14 is in the form of an airplane fuselage, surface 302 is a platform supported on the seat tracks of the fuselage assembly in a manner which will be described in detail presently. The inner positioning system 12 further comprises second carriage means generally designated 306 in FIGS. 14–18 movably carried by the first carriage means 300. Carriage means 306 is adapted for movement on the first carriage means 300 in a direction substantially parallel to the longitudinal axis of workpiece 14 in a manner which will be described.

Figure 14:
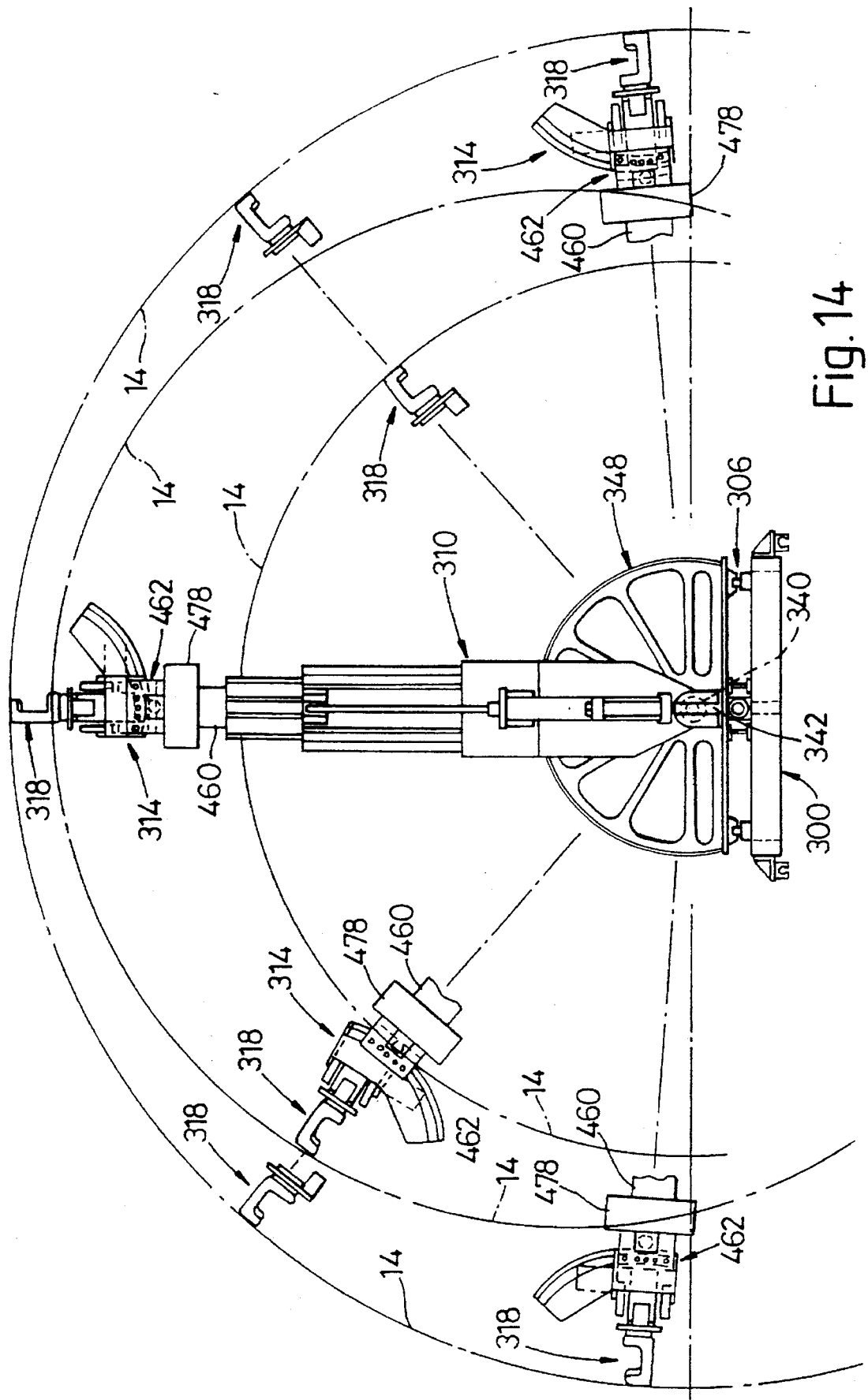
FIG. 14 is an enlarged elevational view, with parts removed and partly diagrammatic, illustrating the inner positioning system operating at one location along the longitudinal axis of the workpiece.
Figure 15:
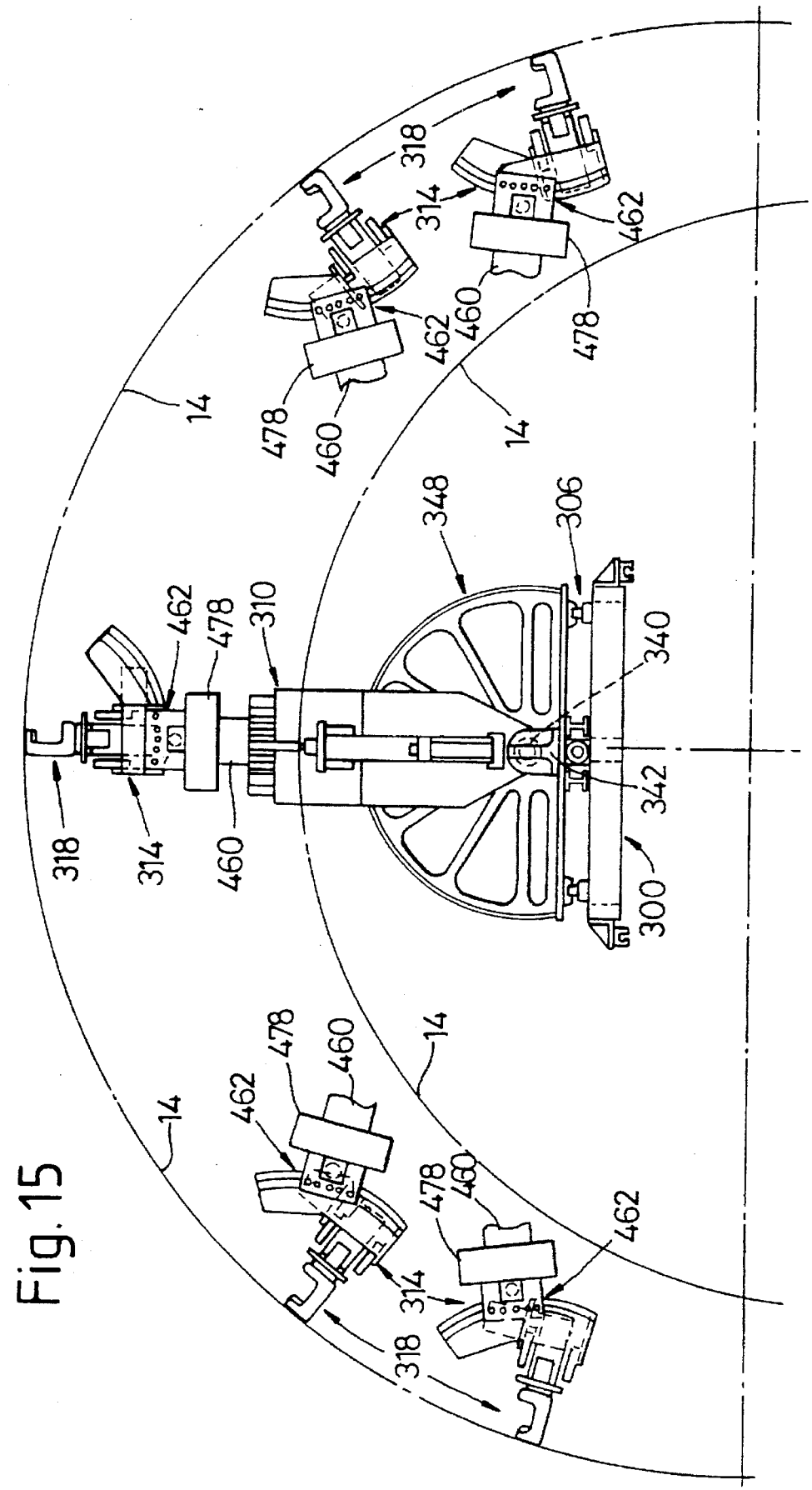
FIG. 15 is an elevational view similar to FIG. 14 showing the inner positioning system operating at another location along the longitudinal axis of the workpiece.

The inner positioning system 12 further comprises arm means generally designated 310 in FIGS. 14–18 which arm means is elongated and having one end on the second carriage means 306 and extending from the second carriage means 306 toward workpiece 14. In the present illustration wherein workpiece 14 is in the form of an airplane fuselage, arm means 310 extends toward the concave inner surface of workpiece 14. The structure and operation of arm means 310 will be described in detail presently. The inner positioning system 12 further comprises head means generally designated 314 in FIGS. 14–16 containing tooling in the form of an anvil generally designated 318 and located on the end of arm means 310 disposed toward workpiece 14. Head means 314, the manner in which it is carried by arm means 310, and the nature and operation of tooling 318 all will be described in further detail presently. FIGS. 14 and 15 show various stages in the operation of arm means 310, head means 314 and tooling 318 to accommodate both the concave inner surface of workpiece 14 and the curvature thereof along the longitudinal axis of workpiece 14.

The apparatus of the present invention further comprises means for moving the first carriage means 300 longitudinally along the workpiece 14. In the illustrative system shown, there is provided a series of platforms 302 supported on the fuselage seat tracks and positioned in an end-to-end relationship longitudinally along workpiece 14. These platforms 302 will be described in detail presently. The first carriage means 300 is supported on a pair of spaced-apart rails 320 shown in FIG. 1 on the platforms and extending longitudinally along the workpiece 14 in a manner which will be described. Movement of carriage means 300 along the rails is provided by a rack and pinion drive, the longitudinally extending rack being mounted along one side of the series of platforms in a manner which will be described. A pinion engaging the rack is driven by an a.c. asynchronous motor on carriage means 300, and position verification is provided by an encoder arrangement, all in a manner well known to those skilled in the art. Accordingly, there is provided macro movement of first carriage means 300 in a direction parallel to the longitudinal axis of workpiece 14 which direction is designated herein as the X axis.

Figures 16, 17:
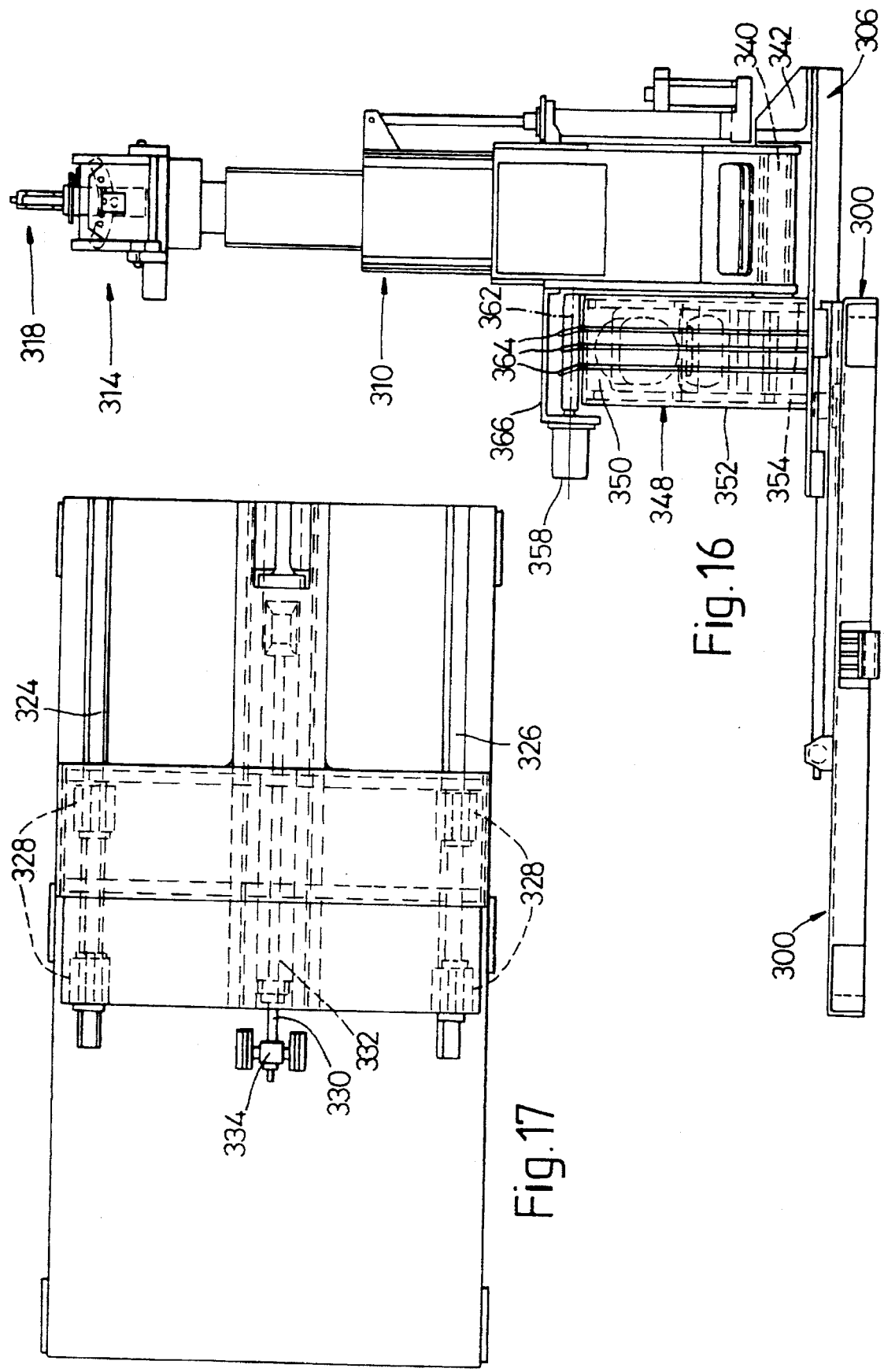
FIG. 16 is an enlarged side elevational view of the first and second carriage means and arm assembly of the inner positioning means.
FIG. 17 is a bottom plan view of the apparatus of FIG. 16.

In accordance with the present invention, there is provided means for moving the second carriage means 306 along the first carriage means 300 and in a direction substantially parallel to the longitudinal axis of workpiece 14, so that when the first carriage means 300 is stationed at any location along the longitudinal axis of workpiece 14, the head means 314 and tooling 318 are moved along the first carriage means 300 and therefore along a corresponding portion of the workpiece 14 in a direction substantially parallel to the longitudinal axis thereof. Movement of the second carriage means 306 along first carriage means 300 is guided by an arrangement of linear guides 324,326 and linear bearings 328 as shown in FIG. 17 in a known manner. Carriage means 306 is moved in response to a ball screw 330 and nut 332 assembly driven by an a.c. synchronous motor 334 with position verification being provided by a suitable encoder arrangement, all in a manner well known to those skilled in the art.

Thus, once macro movement of the first carriage means 300 is provided in the X-axis direction, i.e. parallel to the longitudinal axis of workpiece 14, the foregoing arrangement provides finite positioning of arm means 310 head means 314 and tooling 318 within the frame bay. This movement of second carriage means 306 will be designated herein micro movement in a direction along the X-1 axis. In other words, this allows the first carriage means 300 to be parked at each frame bay location, in correspondence and registry with parking of frame means 20 of the outer positioning system as previously described, with all travel within the frame bay being along the X-1 axis as provided by the foregoing means for moving second carriage means 306. Movement of inner head means 314 along the X-1 axis with second carriage means 306 is in correspondence and in registry with movement of outer head means 80 along the X-1 axis of the outer positioning means as will be described in further detail presently. Movement of second carriage means 306 and with it the head means 314 and tooling 318 along the X-1 axis provides the same advantages previously described herein in connection with the X-1 axis movement in the outer positioning system.

To accommodate the curvature of the exemplary workpiece 14 of the present illustration, the inner positioning system has seven axes of movement. The first, designated herein the X axis as decribed above, is macro horizontal travel of the first carriage means 300 in a direction parallel to the length or longitudinal axis 24 of workpiece 14 to span a frame bay. The second axis, designated herein the X-1 axis as described above, is finite or micro travel of second carriage means 306 and with it head means 314 within the frame bay. This X-1 axis also is parallel to the longitudinal axis 24 of workpiece 14.

At each location where carriage means 300 is parked along workpiece 14 as described hereinabove, arm means 310 is moved to move the inner head means 314 along the arcuate or semi-circular contour of the inner surface of workpiece 14 as viewed in FIGS. 1, 14 and 15, this being along a path in a plane disposed substantially perpendicular to the longitudinal axis 24 of workpiece 14. In the present illustration where workpiece 14 is an aircraft fuselage, this is referred to as macro travel of the inner head 314 along the inner circumference of the fuselage. This is the third axis of movement and is designated herein the a axis. At each location of head means 314 during a axis movement, there is movement of head means 314 about the longitudinal axis 24 of workpiece 14, and this provides finite normalization of head means 314 to the surface of workpiece 14 along the butt splice. This is the fourth axis of movement and is designated herein the a-1 axis.

During the macro travel of the first carriage means 300 along workpiece 14 parallel to the longitudinal axis thereof, i.e. along the X axis, and during the finite travel of the second carriage means 306 and with it head means 314 within the frame bay, i.e. along the x-1 axis, head means 314 is moved by arm means 310 toward and away from workpiece 14 as illustrated, for example, in FIGS. 14–16. This is the fifth axis of movement and is designated herein the Z axis.

During the foregoing Z axis movement, head means 314 is moved in a direction substantially perpendicular to the surface of workpiece 14, and such perpendicularity of head means 314 is maintained by finite normalization of head means 314. Such finite normalization, in turn, is achieved by movement of head means 314 about an axis substantially perpendicular to the longitudinal axis of workpiece 14. This is the sixth axis of movement and is designated herein the b axis.

The seventh axis of movement is designated herein the c axis, and it is movement of head means 314 about an axis parallel to the longitudinal axis of arm means 310. This movement of head means 314 is related to the nature of the tooling 318 in a manner which will be described.

An illustrative arrangement for moving the first carriage means 300 in the X direction, i.e. longitudinally along the workpiece, has been described briefly and will be described in more detail presently in connection with the aforementioned platform arrangement. Also, an illustrative arrangement for moving the second carriage means 306 in the X-1 direction, i.e. along the first carriage means 300 and in a direction substantially parallel to the longitudinal axis of workpiece 14, has been described and is shown in FIGS. 16–17. The structural arrangements for providing the foregoing movements in the a, Z, Y, a-1, b and c axes are illustrated in FIGS. 14–33. Turning first to the a axis, arm means 310 is carried by the second carriage means 306 as previously described. One end of arm means 310, i.e. the inner or lower end as viewed in FIGS. 14–19, is pivotally connected to the second carriage means 306, such as by a rod or shaft 340 extending through the end of arm means 310 and connected to a pair of spaced-apart brackets on carriage means 306, one of which is designated 342 in FIGS. 14–16 and 18. Arm means 310 thus is mounted for pivotal movement at its one end about an axis substantially parallel to the longitudinal axis of workpiece 14. During such pivotal movement of arm means 310, head means 314 is carried on the other end of arm means 310, i.e. on the upper or outer end as viewed in FIG. 14–19, and is moved along a path through a plane substantially perpendicular to the longitudinal axis of workpiece 14. This, in turn, enables head means 314 to be moved along within the contour of the inner surface of workpiece 14 in a manner which will be described.

Arm means 310 is pivoted about the longitudinal axis of rod 340 by means of a drum, capstan and cable arrangement in the following manner. A drum-like structure generally designated 348 is mounted on second carriage means 306 adjacent the lower end of arm means 310 as shown in FIGS. 14, 15 and 17–19. Drum structure 348 is generally semi-circular in shape comprising a wall 350 curved to define a semi-circular shape and supported by a pair of spaced-apart frame members 352,354. The radius of curvature of wall 350 is disposed in a plane parallel to the plane through which arm means 310 travels during pivotal movement thereof. A drive motor and gearbox 358 shown in FIGS. 16, 18 and 19 is supported by a bracket 360 fixed to arm means 310. The output shaft of motor and gearbox 358 is drivingly connected to a capstan 362 located slightly radially outwardly of drum wall 350 and disposed so that the longitudinal axis thereof is parallel to the pivot axis of arm means 310, i.e. parallel to the axis of rod 340. Cable means in the form of a plurality of cables 364 is wound once around capstan 362 and then extends along corresponding portions of the outer surface of drum wall 350 whereupon each cable 364 is fastened at each end to diametrically opposite locations on drum 348. As a result of the frictional engagement between capstan 362 and cable means 364, upon rotation of capstan 362 by motor and gearbox 358, the capstan 362 is caused to travel around the circumference of drum wall 350, the direction of travel depending upon the direction of rotation of capstan 362. By virtue of connection of the capstan 362 motor/gearbox 358 combination to arm means 310 via bracket 360, a point on arm means 310 at the connection to bracket 360 is caused to travel along an arcuate path similar to the path followed by capstan 362 thereby resulting in pivotal movement of arm means 310 about the axis of rod 340. Thus, as capstan 362 travels in either direction along the surface of drum wall 350, head means 314 on the outer end of arm means 310 is moved along a corresponding arcuate path within the contour of the inner surface of workpiece 14.

While the foregoing a axis drive arrangement is preferred, others can be employed such as a gear drive comprising a stationary ring gear on drum structure 348 and a pair of dual opposed motor driven pinions rotatably mounted on a mounting bracket similar to bracket 360 and secured to arm means 310 and disposed so that the longitudinal axes thereof are parallel to the pivot axis of arm means 310, i.e. parallel to the axis of rod 340, and engaging the stationary ring gear at spaced locations along the circumference thereof.

Figures 26, 27:
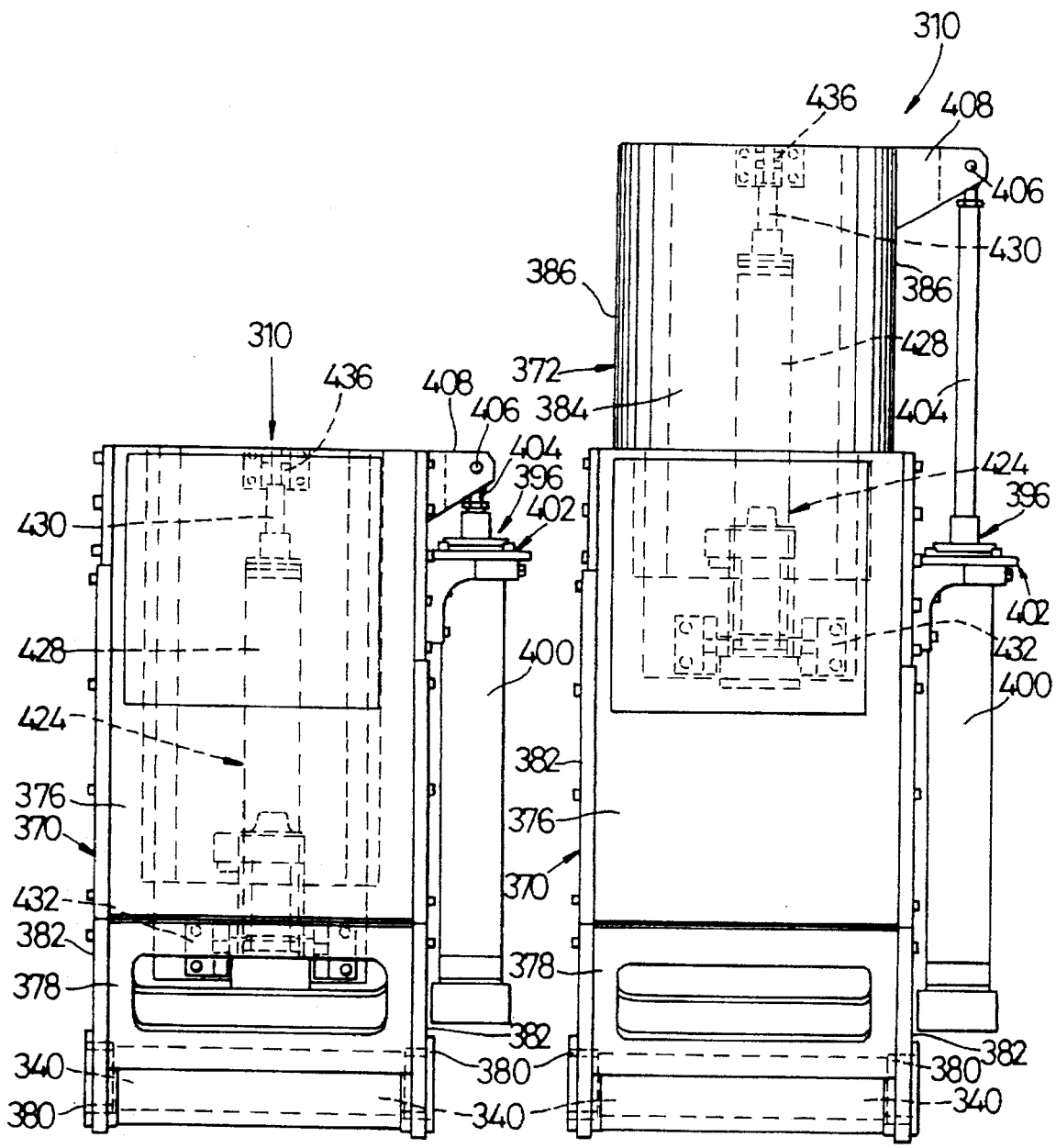
FIG. 26 is a side elevational view of the arm means as it appears in a fully retracted stage of operation.
FIG. 27 is a side elevational view similar to FIG. 26 and showing the arm means in a first stage of telescopic extension.
Figure 28:
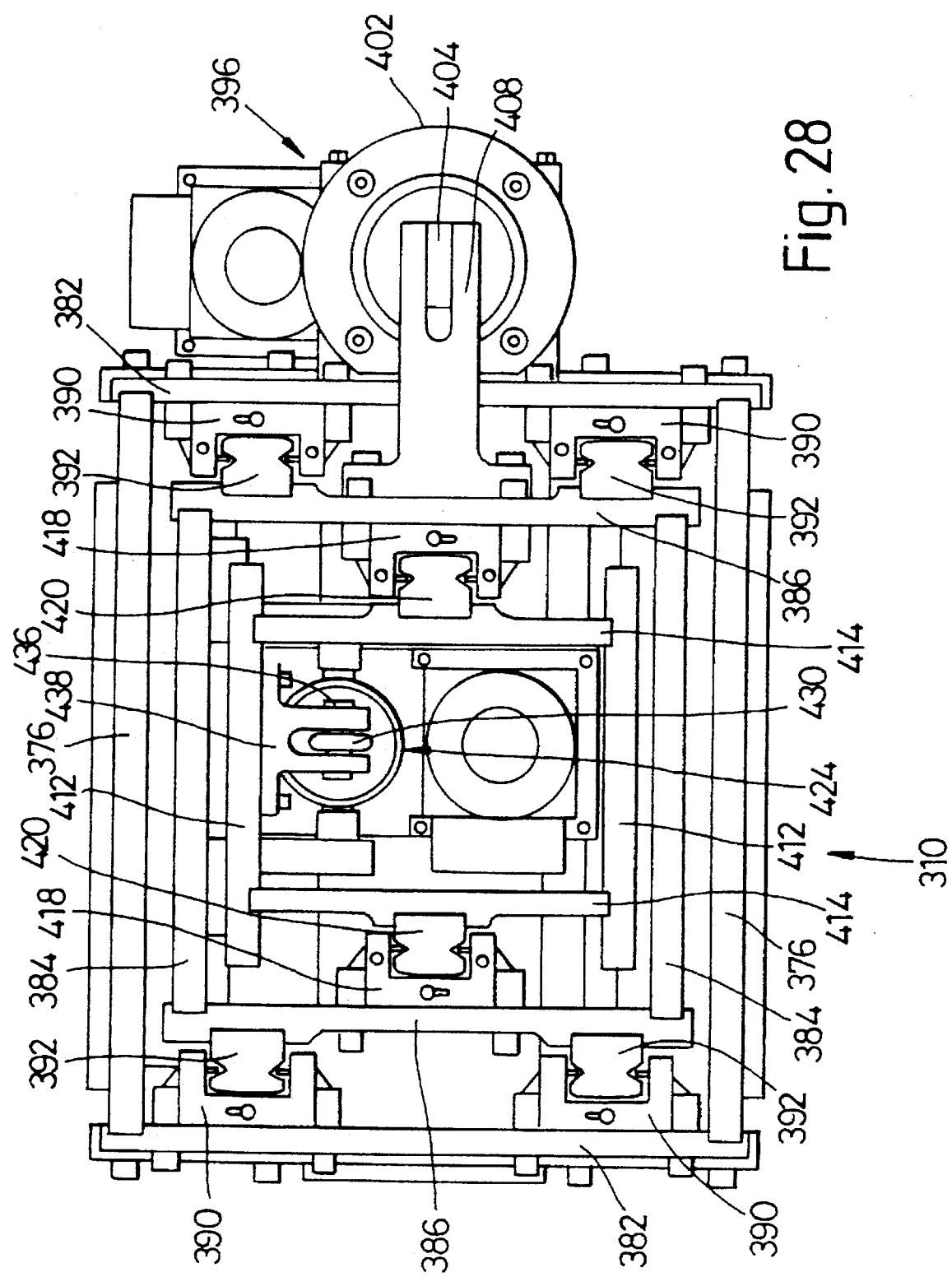
FIG. 28 is a top plan view of the arm means of FIGS. 26 and 27.
Figures 29, 30:
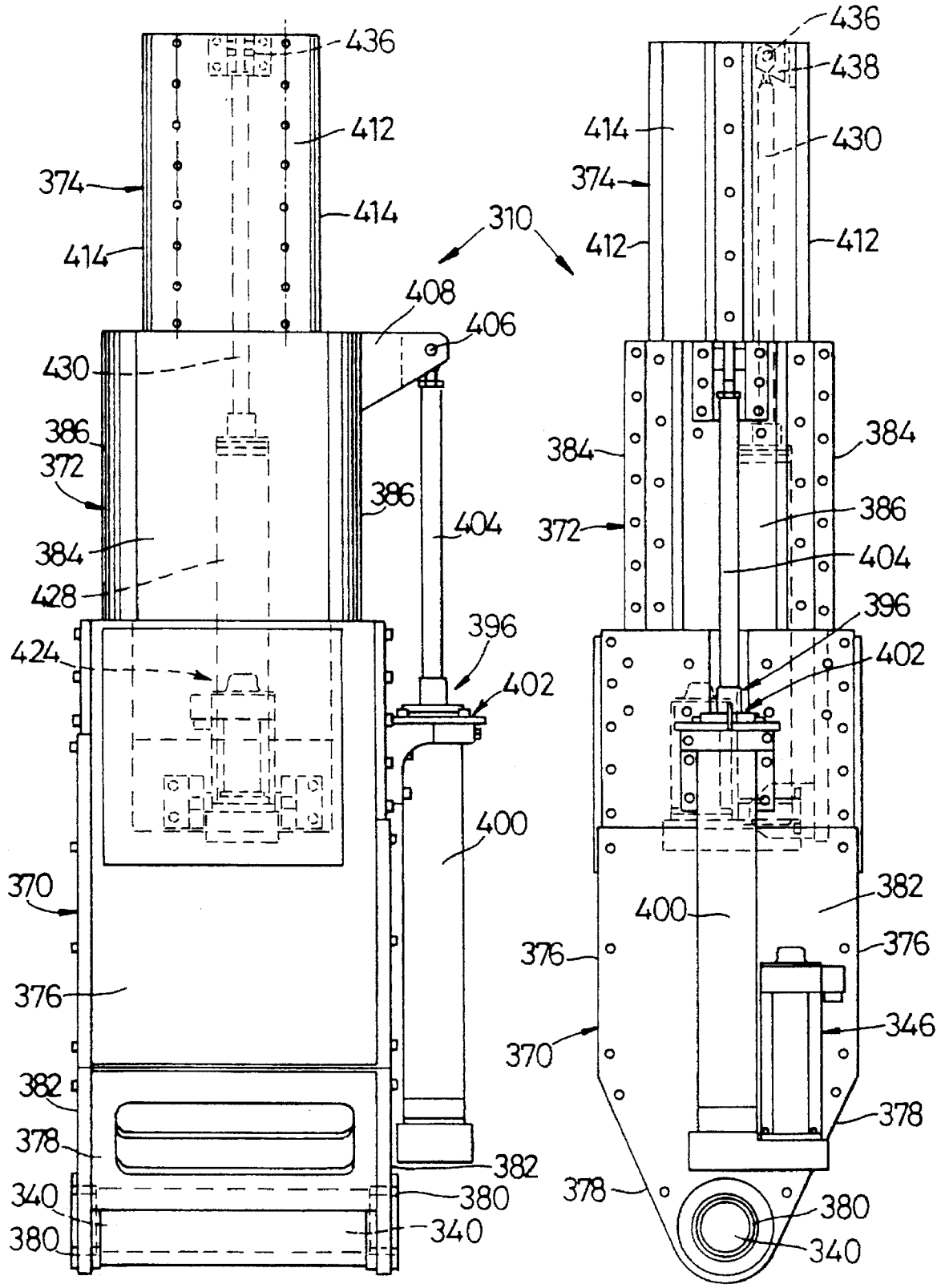
FIG. 29 is a side elevational view similar to FIGS. 26 and 27 and showing the arm means in a fully extended condition.
FIG. 30 is an end elevational view of the arm means of FIG. 29.

Head means 314 is moved by arm means 310 toward and away from workpiece 14 in the Z axis direction by the arrangement shown in detail in FIGS. 26–30. Arm means 310 is telescopic and FIGS. 14 and 15 show arm means 310 at two different stages of telescopic extension. FIG. 26 shows arm means 310 fully retracted, FIG. 27 shows arm means 312 at the first stage of extension and FIGS. 29 and 30 show arm means 310 in fully extended condition. Arm means 310 includes a pivot base assembly 370 extending from the second carriage means 306, a first stage assembly 372 extending from the end of pivot base 370, and a second stage assembly 374 extending from assembly 372 to head means 314. Pivot base assembly 370 is generally hollow rectangular in shape and include a pair of side walls 376 which include tapered side-wall portions 378 which define a trough to receive shaft 340 journalled in a pair of bearings 380 fixed in opposite end walls 382. The pivot base assembly 370 defines an elongated box-like structure open at one end to receive the first stage assembly 372 in telescoping relation. In particular, assembly 372 includes a pair of side walls 384 joined by a pair of end walls 386 to define an elongated box like structure dimensioned to slidably fit in pivot base assembly 370 with the longitudinal axes of assemblies 370 and 372 in substantially coincident relation. Movement of first stage assembly 372 in pivot base assembly 370 is guided by an arrangement of rails and slides. In particular, as shown in FIG. 28, a pair of slides 390 is mounted in spaced parallel relation along the inner surface of each end wall 382 of pivot base assembly 370, the slides 390 extending parallel to the direction of movement of first stage assembly 372. A pair of rails 392 is mounted along the outer surface of each end wall 386 of first stage assembly 372, each of the rails 392 being located as to be received in sliding relation in a corresponding way with the slides 390 as shown in FIG. 28. By way of example, in an illustrative apparatus, slides 390 are of the NKS shim plate type.

Movement of the first stage assembly 372 in and along pivot base assembly 370 is provided by first motive means generally designated 396 in FIGS. 26–30 and in the form of an electrically-operated actuator comprising a housing 400 mounted at the output end thereof to pivot base assembly 370 by means of a saddle assembly 402 holding housing 400 and fixed to an end wall 382 of assembly 370. The screw 404 of the actuator is connected at the outer end thereof through a pin 406 to a clevis 408 fixed to an end wall 386 of the first stage assembly 372 adjacent the outer end of assembly 372 as shown in FIGS. 27 and 29. Thus, extension of screw 404 extends first stage assembly 372 from pivot base assembly 370 as shown in FIGS. 27, 29 and 30 and retraction of screw 404 retracts first stage assembly 372 into pivot base assembly 370 as shown in FIG. 26. By way of example, in an illustrative apparatus, the actuator is of the type commercially available under the designation Raco #5.

The first stage assembly 372 is open at the outer end thereof to receive the second stage assembly 374 in telescoping relation therein. Assembly 374 is hollow rectangular in shape including a pair of side walls 412 joined by a pair of end walls 414 to define an elongated box-like structure dimensioned to slidably fit in first stage assembly 372 with the longitudinal axes of the assemblies in substantially coincident relation. Movement of second stage assembly 374 in first stage assembly 372 is guided by an arrangement of rails and slides. In particular, as shown in FIG. 28, a slide 418 is mounted along the inner surface of each end wall 386 of first stage assembly 372, the slides 418 extending parallel to the direction of movement of second stage assembly 374. A rail 420 is mounted along the outer surface of each end wall 414 of second stage assembly 374, each of the rails 420 being located so as to be received in sliding relation in a corresponding way with the slides 418 as shown in FIG. 28. By way of example, in an illustrative apparatus, slides 418 are of the NKS shim plate type.

Movement of the second stage assembly 374 in the first stage assembly 372 is provided by second motive means generally designated 424 in FIGS. 26–29 and in the form of an electrically-operated actuator comprising a housing 428 located in the first stage assembly and having a screw 430 connected to the outer end of the second stage assembly 374. In particular, the end of housing 428 opposite screw 430 is fixed to a bracket 432 mounted in the first stage assembly 372 adjacent the inner end thereof. Screw 430 is connected at the outer end thereof through a pin 436 to a clevis 438 fixed to a side wall 412 of the second stage assembly 374 adjacent the outer end of the assembly 374 as shown in FIGS. 29 and 30. Thus, extension of screw 430 extends second stage assembly 374 from the first stage assembly 372 as shown in FIGS. 29 and 30, and retraction of screw 430 retracts second stage assembly 374 into first stage assembly 372 as shown in FIGS. 26 and 27. By way of example, in an illustrative apparatus, the actuator is of the type commercially available under the designation Raco #4.

Figure 20:
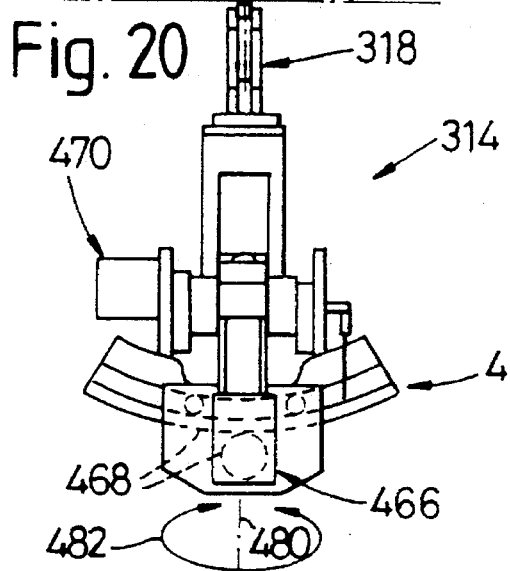
FIGS. 20–22 are elevational views of the end of arm assembly illustrating movement about the a-1 and c axes.
Figure 23:
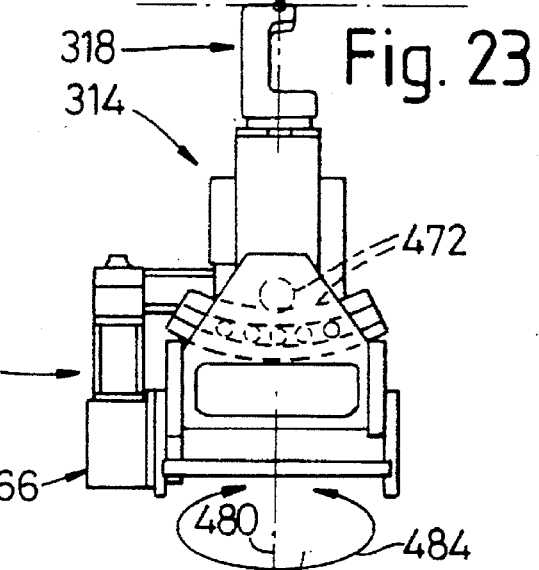
FIGS. 23–25 are elevational views similar to FIGS. 20–22 pivoted 180 degrees about a vertical axis as viewed in the drawing and illustrating movements about the b and c axes.
Figure 21:
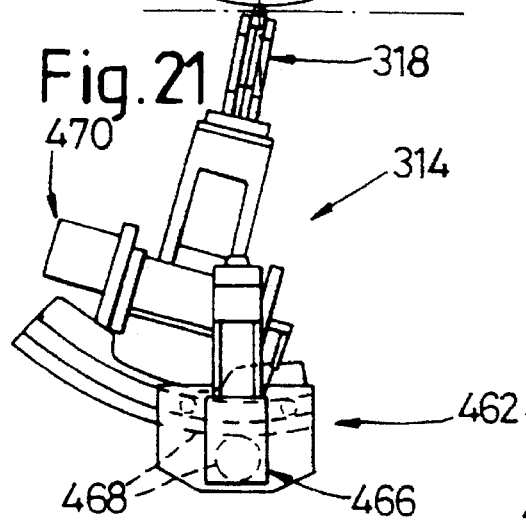
Figure 24:
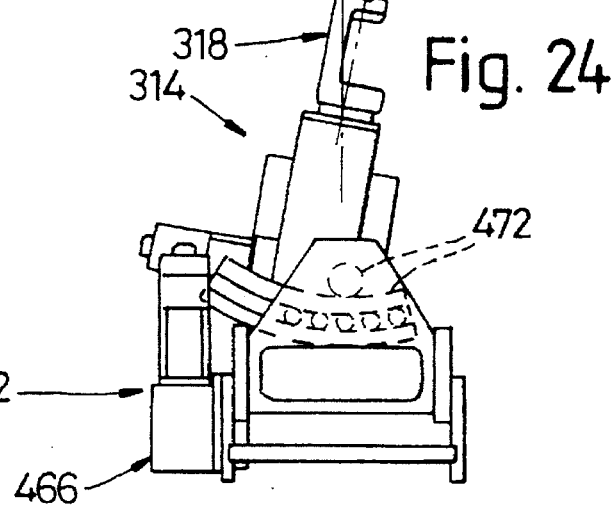
Figure 22:
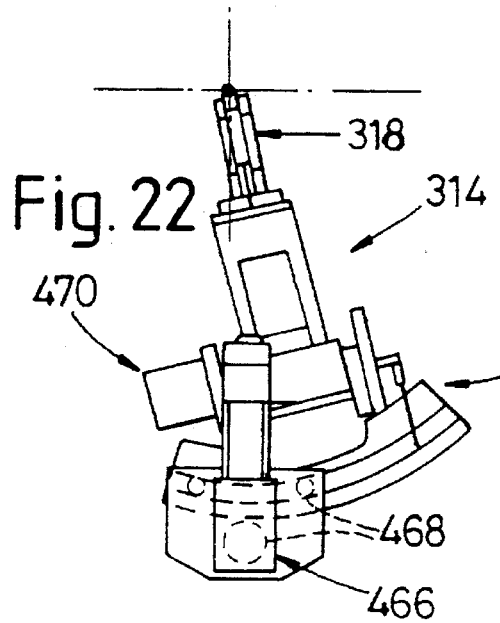
Figure 25:
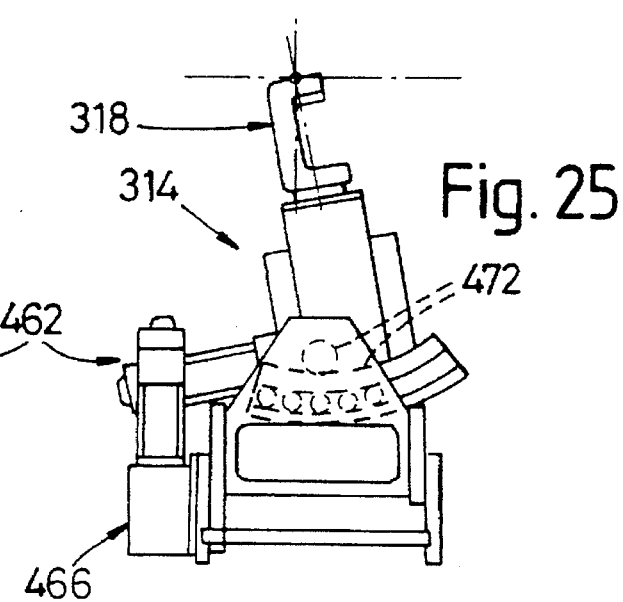
Figure 31:
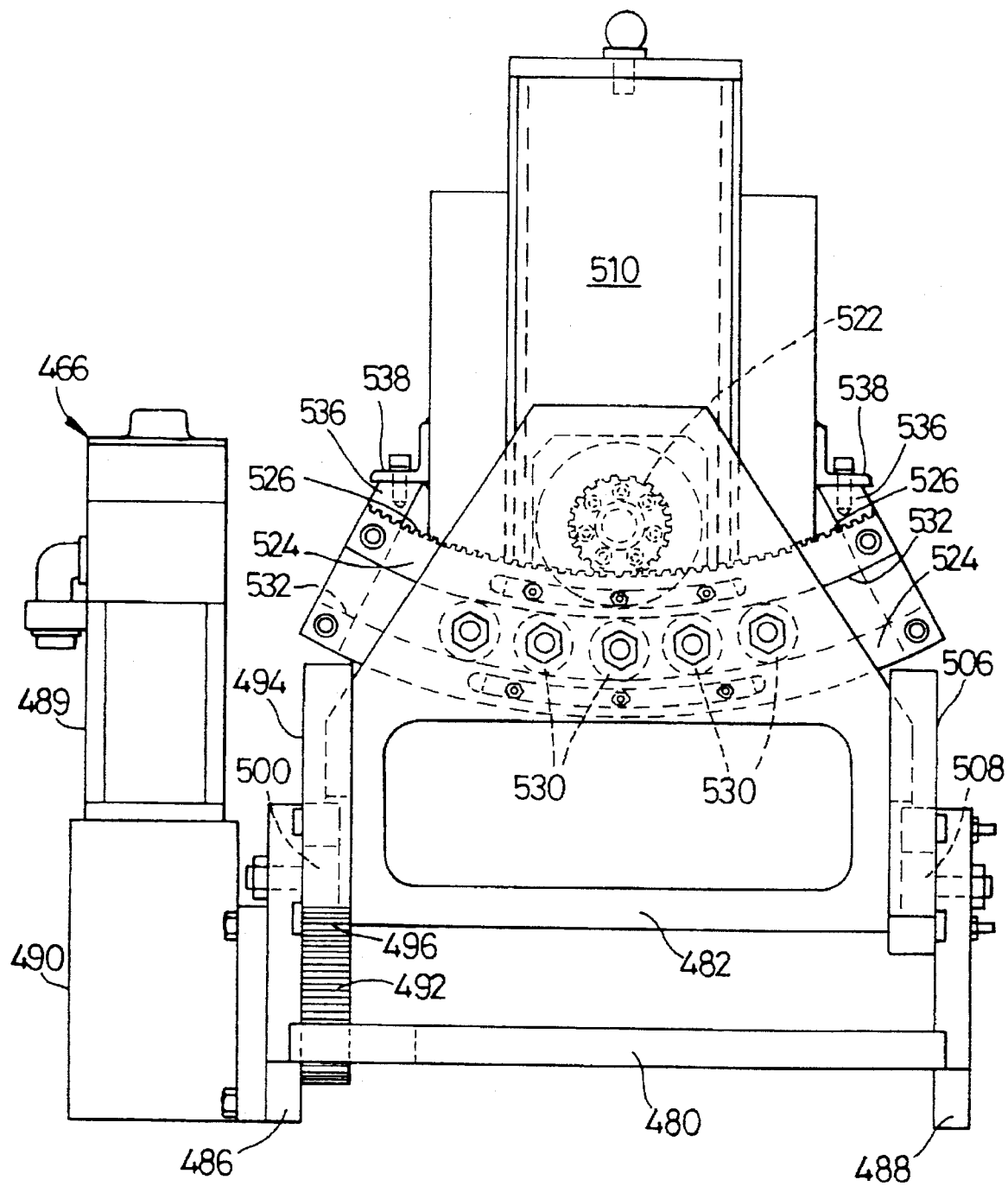
FIG. 31 is an enlarged elevational view of the end of arm assembly.
Figure 32:
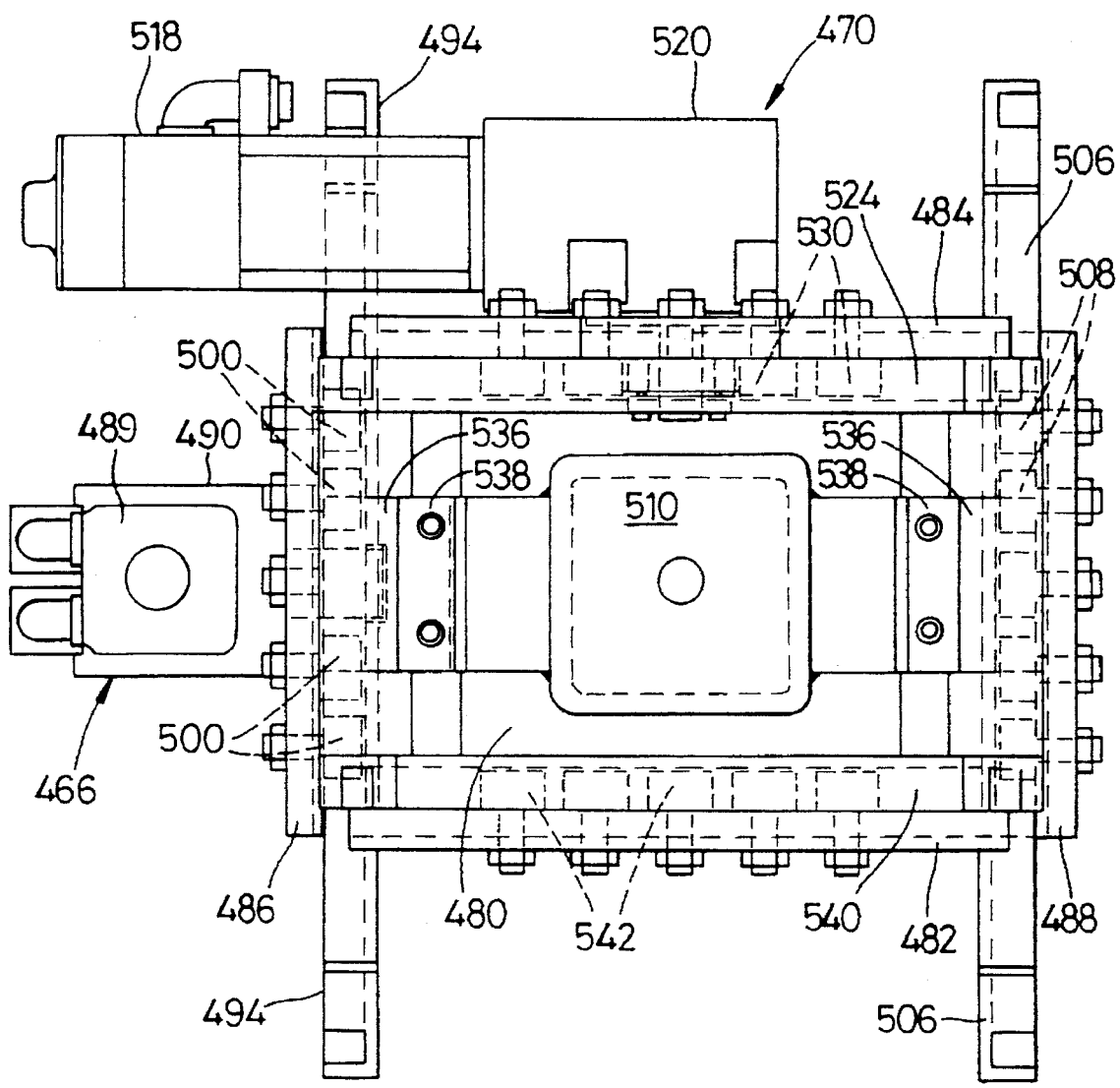
FIG. 32 is a top plan view thereof.
Figure 33:
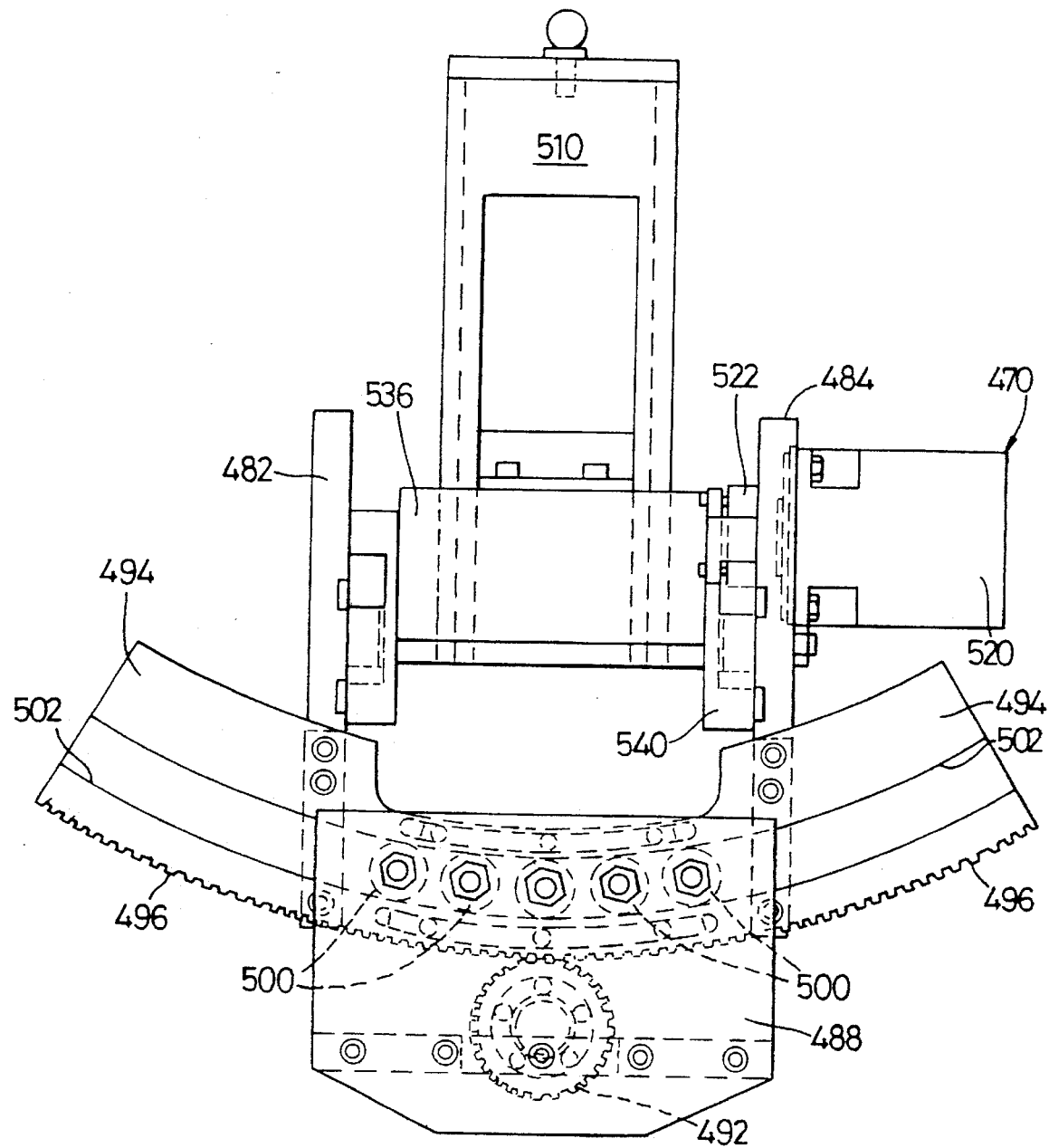
FIG. 33 is an elevational view of the assembly of FIG. 31 rotated 180 degrees about a vertical axis as viewed in FIGS. 31 and 33.
Figure 40:
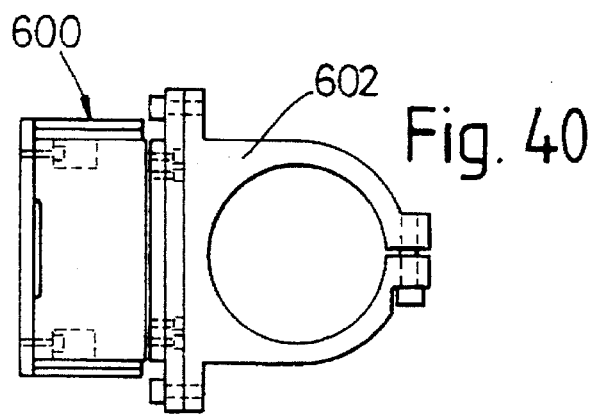
FIG. 40 is a top plan view with parts removed of a portion of the head means of FIG. 39.

The structural arrangements for providing the movements about the a-1, b and c axes are illustrated generally in FIGS. 20–25 and shown in further detail in FIGS. 31–33. The outer end of arm means 310, i.e. the outer end of second stage assembly 374, is coupled to head means 314 by means of a spacer component 460 as shown in FIGS. 14 and 15. Head means 314 includes an end of arm assembly generally designated 462 in FIGS. 20–25. Assembly 462 includes, briefly, a frame assembly, first motive means 466 associated with movement about the a-1 axis, first means 468 for converting the output of motive means 466 into movement of end of arm assembly 462 and thus head means 314 about the a-1 axis, second motive means 470 associated with movement about the b axis, and second means 472 for converting the output of motive means 470 into movement of the end of arm assembly 462 and thus head means 314 about the b axis. FIGS. 20–22 illustrate the movements about the a-1 axis, i.e. roll, wherein FIG. 20 shows assembly 462 and head means 314 in an initial position or zero degrees of a-1 axis movement, FIG. 21 shows movement about the a-1 axis a small angular distance, for example 10°, in a positive overtravel from the initial position of FIG. 20, and FIG. 22 shows movement of assembly 462 and head means 314 about the a-1 axis a small angular distance, for example about 10°, in a negative overtravel from the initial position of FIG. 20. Similarly, FIG. 23 shows assembly 462 and head means 314 in an initial position or zero degrees of b axis movement, FIG. 24 shows movement, i.e. pitch, about the b axis a small angular distance, for example 10°, in a positive overtravel from the initial position of FIG. 23, and FIG. 25 shows movement of assembly 462 and head means 314 about the b axis a small angular distance, for example about 10°, in a negative overtravel from the initial position of FIG. 23.

Movement of end of arm assembly 462 and thus head means 314 about the c axis is provided by rotary drive means 478 in spacer component 460 as shown in FIGS. 14 and 15, the end of an assembly 462 being rotatably coupled to spacer 460. Such movement is about the axis 480 shown in FIGS. 20 and 23 and in either rotational direction indicated by arrows 482 and 484 in FIGS. 20 and 23, respectively.

The end of arm assembly 462 is shown in greater detail in FIGS. 31–33 and comprises a frame assembly including a bottom plate 480, spaced-apart front and rear mounting plates 482,484 disposed in planes substantially perpendicular to the plane of bottom plate 480 and a pair of spaced-apart end plates 486,488 which also are disposed in planes substantially perpendicular to bottom plate 480. End plates 486,488 are disposed at substantially right angles to mounting plates 482,484. The afore-mentioned first motive means 466 associated with movement about the a-1 axis comprises a servo motor 489 and gear box 490 which are mounted to end plate 486 as shown in FIG. 31. The afore-mentioned first means 468 for converting the output of motive means 466 into movement of the head means about the a-1 axis comprises a large pinion gear 492 drivenly connected to the output of gear box 490 and a first gimbal frame element 494 provided with teeth 496 along one surface thereof in operative or meshing engagement with pinion 492. In particular, element 494 is in the form of an arcuate-shaped gear segment wherein teeth 496 are provided along the convex lower edge thereof as seen also in FIG. 33. Movement of element 494 is guided by bearing means operatively associated with element 494 and the frame structure. In the assembly shown, a series of Cam Roll type bearings 500 mounted on end plate 486 are received in an arcuate track 502 provided in element 494. The gimbal frame element 494, in turn, is mounted to corresponding ends of the front and rear mounting plates 482,484 as shown in FIGS. 31 and 33. A companion or second gimbal frame element 506 is provided, being mounted to opposite ends of the mounting plates 482,484 as shown in FIG. 31 and being guided for corresponding movement by an arrangement of an arcuate track along element 506 and Cam Roll type bearings 508 received therein and mounted on end plate 488.

The front and rear mounting plates 482,484 are mounted to a base structure 510 which is adapted for connection to head or anvil 318 which is not shown in FIGS. 31–33. Accordingly, operation of drive means 466 rotates pinion 492 to cause movement of gimbal elements 494,506 about the a-1 or roll axis, the direction of movement about the axis depending upon the direction of rotation of pinion 492. Movement of gimbal elements 494,506 in turn causes movement of tooling 318 about the a-1 axis.

The afore-mentioned second motive means 470 associated with movement about the b axis comprises a servo motor 518 and gear box 520 which are mounted to rear mounting plate 484 as shown in FIG. 32. The afore-mentioned second means 472 for converting the output of motive means 470 into movement of the head means about the b axis comprises a relatively smaller pinion gear 522 drivenly connected to the output of gear box 520 and a first, relatively smaller gimbal frame element 524 provided with teeth 526 along one surface thereof in operative or meshing engagement with pinion 522. In particular, element 524 is in the form of an arcuate-shaped gear segment which is relatively smaller than element 494 and wherein teeth 526 are along the concave upper edge thereof as seen in FIG. 31. Movement of element 524 is guided by bearing means operatively associated with element 524 and the frame structure. In the assembly shown, a series of Cam Roll type bearings 530 mounted on front mounting plate 484 are received in an arcuate track 532 provided in element 524. The gimbal frame element 524, in turn, is connected to base structure 510 by suitable means, such as cross ties 536 and brackets 538 as shown in FIGS. 31 and 32. A companion or second gimbal frame element 540 is provided, being mounted to the opposite ends of the cross ties 536 and being guided for corresponding movement by an arrangement of an arcuate track along element 540 and Cam Roll type bearings 542 received therein and mounted to rear mounting plate 482.

Operation of drive means 470 rotates pinion 522 to cause movement of gimball elements 524, 540 about the b or pitch axis, the direction of movement about the axis depending upon the direction of rotation of pinion 522. Movement of gimbal elements 524,540 in turn causes movement of tooling 318 about the b axis.

As previously described, in the present illustration wherein workpiece 14 is in the form of an airplane fuselage, the inner positioning system 12 moves along a supporting surface 302 in the form of a series of platform sections supported on the seat tracks of the fuselage assembly and extending in end-to-end relation along the longitudinal axis of workpiece 14. One such platform section 550 is shown in detail in FIGS. 34–38, it being understood that a plurality of platforms 550 are joined end-to-end along workpiece 14 to define supporting surface 302. Platform 550 is provided with four pallet spring-loaded wheel assemblies 552, 554, 556 and 558 on the under side thereof for engaging a pair of seat tracks, one track being designated 560 in FIG. 36 and the other designated 562 in FIG. 37. The upper surface of platform 550 is provided with a pair of rails 320 shown also in FIG. 1 over which carriage means 300 of the inner positioning system 12 travels. Rails 320 extend along opposite sides of platform 550. A rack 564 is provided along one side edge of platform 550 which is engaged by a motor-driven pinion on carriage 300 (not shown) for moving the inner positioning means 12 along the series of end-to-end platforms 550. Platform 550 can be provided with a pair of spaced-apart supporting ribs 568 generally centrally thereof. Adjacent platforms 550 are aligned by engagement between a pair of alignment pins 561 in rail pair 320 along one end of a platform and a pair of alignment recesses 562 in rail pair 320 along the adjacent end of the adjacent platforms. Adjacent platforms 550 are connected by engagement between a pair of over-center latches or toggle clamps 570 along one end of a platform and a pair of clamp-engaging members 572 along the adjacent end of the adjacent platform. Once all adjacent platform sections 550 are aligned and clamped together in end-to-end relation, quarter turn locks 574 are utilized to engage lock cam 576 into seat tracks 560,562. This action collapses the spring-loaded wheel assemblies 552,554,556 and 558 and firmly secures the platforms 550 to the aircraft structure. This arrangement provides a rigid track system to facilitate operation of the inner positioning system 12.

Figure 39:
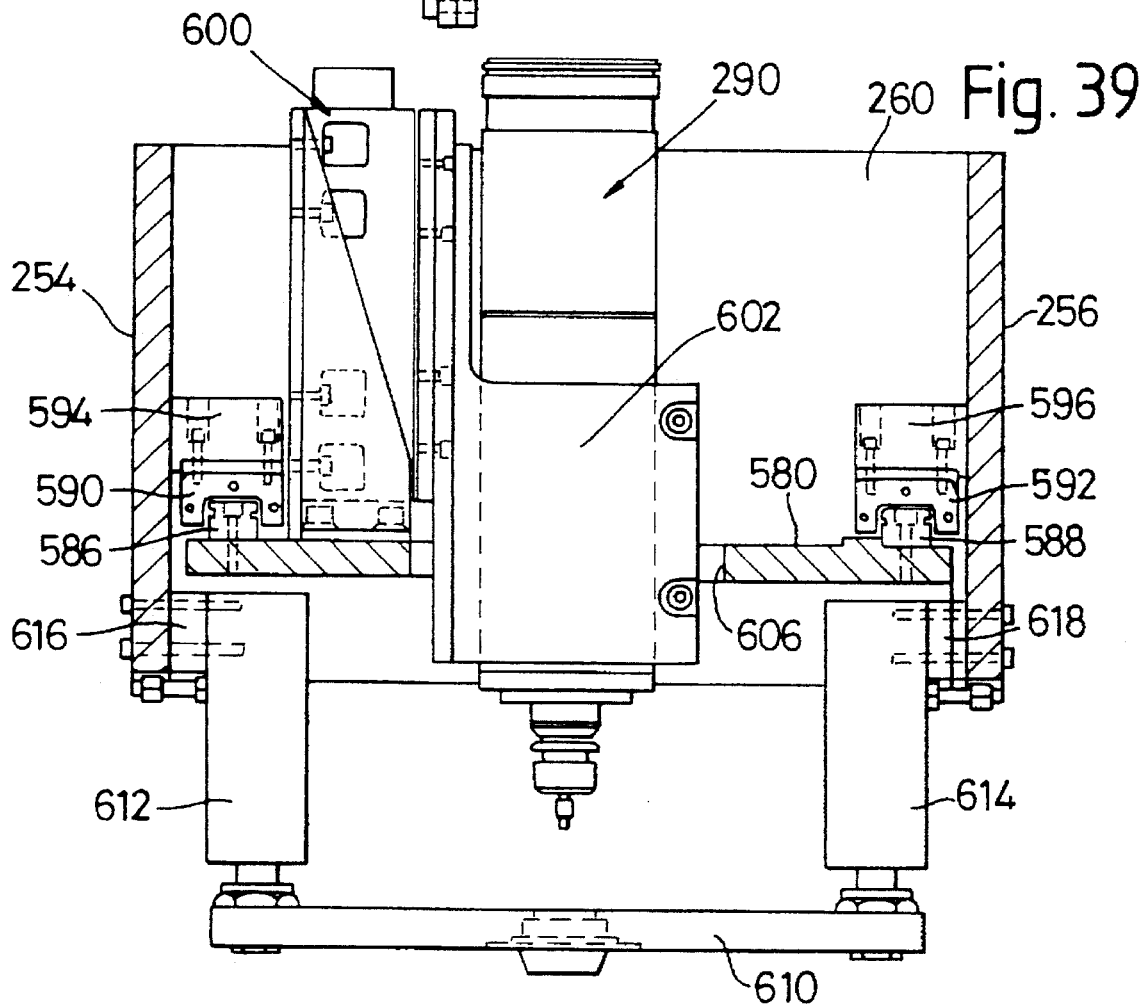
FIG. 39 is an end elevational view, partly in section, of the head means in the outer positioning means of FIGS. 1–13.
Figure 41:
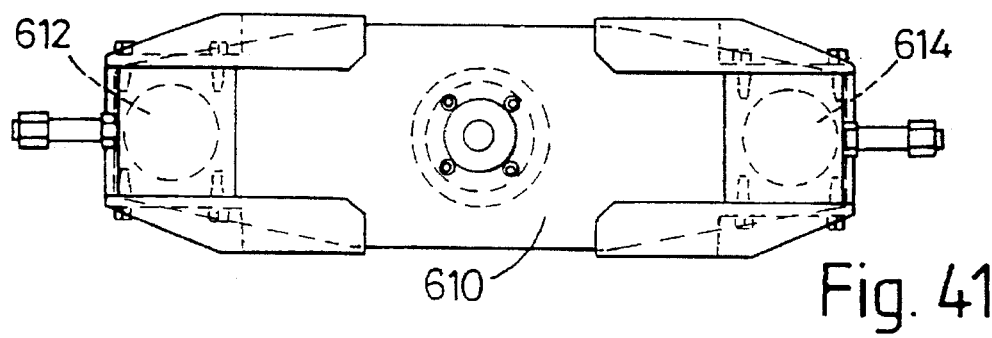
FIG. 41 is a bottom plan view with parts removed of the head means of FIG. 39.

FIGS. 39–45 illustrate in further detail the head means 80 of outer positioning system 10. As previously described, head means 80 is within the inner box structure defined by the pair of spaced apart side walls 254,256 joined by the pair of spaced apart end walls 258,260. Also as previously described, head means 80 includes a plurality of tools in spaced relation along a line and moved into and out of alignment with a work axis by a transfer mechanism. By way of example, one tool in the form of drill 290 is shown in FIGS. 39 and 42 by way of illustration. The transfer mechanism includes a transfer plate 580 on which each of the tools such as drill 290 is carried. Plate 580 is disposed in a plane parallel to the longitudinal axis of the inner box structure containing head means 80, and during operation by any of the tools of head means 80 on workpiece 14 the plane of transfer plate 580 is disposed substantially perpendicular to the work axis. Transfer plate 580 is moved along the plane to transfer the various tools into and out of alignment with the work axis for performing various operations on workpiece 14. Transfer plate 580 is supported and guided for such movement by the following arrangement. Transfer plate 580 is provided with a pair of rails 586,588 extending along and adjacent the sides of plate 580 on the upper surface thereof as viewed in FIGS. 39 and 42–45. Rails 586 and 588 are slidably carried by a pair of bearing blocks 590 and 592, respectively, which in turn are mounted to inner box side walls 254 and 256, respectively, by corresponding brackets 594 and 596. Reciprocating movement of transfer plate 580 can be provided by various suitable means, one illustration being a ball screw or actuator 598, the housing of which is mounted to the one inner box end wall 260 and the rod of which is threaded in a bracket mounted to plate 580. Alternatively, a servo controlled hydraulic cylinder arrangement can be employed.

Drill 290 is mounted on transfer plate 580 for movement into and out of alignment with the work axis and for movement toward and away from the workpiece 14 by the following arrangement. A port 600 is mounted on the lower end thereof to plate 580, and the body of drill 290 is clamped within a bracket 602 movably carried by port 600 in a manner allowing movement of drill 290 in a direction parallel to the longitudinal axis of port 600. An opening 606 provided in plate 580 accommodates movement of drill 290 toward and away from workpiece 14, the movement of drill 290 being provided by an actuator or cylinder (not shown) in a known manner. The movable connection between bracket 602 and post 600 includes bearings to insure accurate movement of drill 290 along the work axis in a known manner. The arrangement can also include encoder components for monitoring movement of drill 290 in a known manner.

A pressure foot plate 610 is located below the tools carried by transfer plate 580 and is moved into and out of contact with workpiece 14 in a known manner by a pair of cylinders 612 and 614, the rods of which are connected to opposite ends of pressure foot plate 610 and the housings of which are mounted to side walls 254,256 by brackets 616,618.

FIGS. 46–48 illustrate one exemplary arrangement for maintaining alignment of the heads of the inner and outer positioning systems on opposite sides of workpiece 14 of non-magnetic material such as aluminium. A pair of magnetic flux sensors 620 are provided on pressure foot plate 610 of outer positioning system 10, and a pair of ferrous, i.e. magnetic, target elements 622 are provided on a clamp sleeve structure 624 on the head means 314 of the inner positioning system 12. The relative positions between sensors 620 and targets 622 are predetermined such that sensors 620 obtain peak signals when the inner and outer heads are in proper alignment on opposite sides of workpiece 14. FIG. 46 illustrates the inner and outer heads in desired alignment and FIG. 47 illustrates the heads out of alignment. The enlarged view of FIG. 48 shows the misaligned condition wherein the degree of mis-alignment is indicated by arrows 630. The typical air gap between sensors 620 and the surface of workpiece 14 is indicated by arrows 632. The worklines of the inner and outer heads are designated 634 and 636, respectively. Lines 640 represent the spatial relationship between sensors 620 and targets 622 and to some extent the signal relationship therebetween.

The operation of the tool positioning method and apparatus of the present invention is illustrated by considering its use in riveting the skin lap splices and butt splices of an airplane fuselage. A form of control system for controlling the outer and inner positioning systems 10 and 12, respectively, is shown in FIG. 49, and it is an adaptive and master-slave type of control. In particular, the control system is adaptive in that it senses the locations of structural formations on the inner surface of workpiece 14 such as lap joint and butt joint edges, stringers and frames and then controls movement of inner positioning system 12 in relation to those structural formations. The control system is master-slave in that once the inner positioning system 12 is moved into position, the outer positioning system 10 is moved in accordance with the location of the inner positioning system 12.

FIG. 50 illustrates diagrammatically the structural formations on the inner surface of workpiece 14 which the control system of FIG. 49 is responsive to. In the illustrative example of an airplane fuselage, workpiece 14 comprises an outer shell 660, a plurality of stringers 662 which extend longitudinally of the fuselage and are attached along the inner surface of shell 660 and at relatively closely-spaced locations along the inner circumference of shell 660, and a plurality of frames, one of which is designated 664 in FIG. 50, attached to stringers 662 at spaced locations longitudinally along the fuselage. Each frame 664 is in the form of a channel member having a web 666 and substantially parallel flanges 668,670 extending from web 666 at right angles thereto. A plurality of arcuate frame members 664 extend around the inner circumference of shell 660 at each of the spaced locations along the length of the fuselage. A lap splice generally designated 672 extends along the entire length of the fuselage outer shell 660. A butt splice generally designated 674 in FIGS. 4 and 5 extends around the entire circumference of the fuselage outer shell 660.

The stringers 662, frames 664 and the edges of the outer shell 660 along the lap and butt splices 672 and 674, respectively, comprise structural formations which the control system of FIG. 49 is responsive to. In particular, these structural components are at defined spatial locations on the fuselage, i.e. they are arranged in a quantitatively definable manner such as in an X,Y,Z co-ordinate system within a tolerance band and the locations of these various components can serve as points of reference within that tolerance band. Such points of reference, in turn, can be used to guide the macro inner positioning system 12 along and around the inner surface of shell 660 to desired locations for installing fasteners along the lap and butt splices 672 and 674, respectively. In this connection, the fact that the various lap and butt splices 672 and 674 have known locations within a tolerance band relative to, and are at definite known distances from, the stringers 662 and frames 664 is utilized in the control and guidance of inner positioning system 12. The actual locations of the stringers 662, frames 662 and the edges of the lap and butt slices 672 and 674, respectively, are sensed by suitable sensing means on the inner micro positioning system 12, for example optical sensing means employing lasers, and such sensing means along with position verification devices can be employed for each axis of travel of inner positioning system 12.

Referring now to FIG. 49, the control system includes an inner control portion or station 682 operatively associated with the inner positioning system 12 and responsive to the arrangement and locations of the structural formations on the workpiece inner surface, as described in connection with FIG. 50, for controlling movements of the inner positioning system 12 in relation to those structural formations. The control system also includes an outer control portion or station 684 operatively associated with the outer positioning system and slaved to the inner control portion 682 for controlling movements of the outer positioning system 10 in relation to the location of the inner positioning system 12. The inner and outer control portions 682 and 684 travel along the workpiece 14 with the inner and outer positioning systems 12 and 10, respectively. Electrical connections to the inner and outer control portions 682 and 684, respectively, are provided by a plurality of extendable electrical cables 690 fed from cable reels 692 at a stationary location such as a platform 694 at the beginning or entrance end of the workpiece 14. As shown in FIG. 49, two of the cables connect a transformer 696 to the various electric motors comprising the drives on the positioning systems 10,12. The other two cables connect the control portions 682,684 to a workstation monitor 698.

Turning first to the inner control portion or station 682 it is centered around a main controller 702 which, by way of example, can be a robotic control system commercially available under the designation Adept "Iceberg". The sensors designated 704 provide information to controller 702 about the structural formations on the inner surface of workpiece 14 as described hereinabove in connection with FIG. 50. Controller 702 uses this information to control movement of inner positioning system 12 along the seven axes of movement previously described. Sensor 706 provides information to controller 702 as to alignment or the degree of mis-alignment between the inner and outer heads as described in connection with FIGS. 46–48. Component 708 is an input/output rack associated with machine tool control functions on the inner head. There is also provided a group of monitors designated 710.

The outer control portion or station 684 is centered around a main controller 712 which, like controller 702, can be a robotic control system commercially available under the designation Adept "Iceberg". The sensors designated 714 can provide information to controller 712 about locations of the lapp and butt joint seams on the outer surface of workpiece 14 in a manner similar to sensors 704 of the inner control portion. Sensor 716 provides information to controller 712 as to alignment or the degree of mis-alignment between the inner and outer heads as described in connection with FIGS. 46–48. Component 718 is a programmable logic controller, for example of the type commercially available from Allen-Bradley, for various machine tool operations associated with the upper head. Component 720 is an input/output rack for control of various valves and responsive to limit switches in the upper head associated with such control functions as drill speed and feed rate.

Under control of the system of FIG. 49, the inner positioning system 12 is moved first to the location of fastener installation by operation of the first and second carriages 300 and 306, respectively, the telescopic arm 310 in connection with the drum, capstan and cable arrangement, and the end of arm assembly. Next the outer positioning system 10 is moved into position in opposition to the inner system 12 by operation of frame means 20, the X-1 axis drive arrangement, movement of frame means 100 by the a axis drive arrangement, and the arrangement of nested boxes and carriages shown in FIGS. 6–13. After normalization to the outer surface of workpiece 14 as previously described the inner and outer heads are aligned as previously described in connection with FIGS. 46–48. With the outer head normalized, the inner head is rotated about the c axis as previously described to maintain proper rotational alignment between the inner and outer tooling. The pressure foot plate 610 is moved into contact with workpiece 14 whereupon clamping force is exerted by inner sleeve 624 on workpiece 14 against pressure foot plate 610 whereupon an automatic drill, rivet insertion and bucking cycle is executed by the tooling in a known manner. Upon completion of the cycle, the inner and outer heads unclamp and retract to the working stroke level. The foregoing operations are repeated at the location of the next fastener installation. All of the foregoing operations are carried out under control of the system of FIG. 49 for controlling and monitoring movement and operation of the components of the inner and outer positioning systems.

The positioning apparatus of the present invention has the capability of operating on a plurality of workpieces 14. When the outer and inner positioning systems 10 and 12, respectively, have completed operations on one workpiece, for example workpiece 14, they can be transferred conveniently and easily to another workpiece, for example workpiece 14' shown in FIGS. 1 and 4. Workpieces 14 and 14' are arranged in spaced relation with the longitudinal axes 24 and 24' thereof in substantially parallel relation and with the open ends thereof facing in the same direction, i.e. the ends facing outwardly as viewed in FIG. 1 or located at the left in FIG. 4. While only two workpieces 14,14' are shown in FIGS. 1 and 4, that is for convenience in illustration, and a number of additional workpieces can be included along a row, with the longitudinal axes thereof in spaced parallel relation and with the open ends thereof facing in the same direction.

The outer 10 and inner 12 positioning systems are transferred between various workpieces in the following manner. There is provided lateral transfer means generally designated 730 movable at substantially a right angle to the longitudinal axes 24,24' of workpieces 14,14' along a path 732 adjacent the open ends of workpieces 14,14' for receiving and supporting the frame means 20 carrying outer positioning system 10 for receiving and supporting inner positioning system 12 so that when tooling operations are completed on one of the workpieces, for example workpiece 14, the frame means 20 and inner positioning system 12 can be moved longitudinally from workpiece 14 through the open end thereof and onto lateral transfer means 730, which would be located adjacent the open end of workpiece 14. Then lateral transfer means 730 is moved along path 732 to another of the workpieces, for example workpiece 14', whereupon the outer positioning system 10 carried by frame means 20 and the inner positioning system 12 are moved from lateral transfer means 730 longitudinally relative to workpiece 14' through the open end thereof and into position for operating on workpiece 14'.

As shown in FIGS. 1, 4 and 5 one form of lateral transfer means comprises a wheeled vehicle 736 movable laterally relative to workpieces 14,14' along track means in the form of a pair of spaced apart rails 738 extending along path 732. Rails 738 are supported by a platform generally designated 740 in FIGS. 1, 4 and 5 which platform structure 740 is rigidly tied into the other supporting structures including platforms 60 and 62. Vehicle 736 has a top surface provided with first track means in the form of rails 744 for supporting frame means 20 with outer positioning system 10 thereon and is provided with second track means in the form of rails 746 for supporting inner positioning system 12. The first and second track means 744 and 746, respectively, are disposed substantially at right angles to the path 732 of movement of vehicles 736 and, as shown in FIG. 4, are in longitudinal alignment with rails 74,76 and 320. In particular, rails 744 are longitudinally aligned with rails 74,76 on platforms 60,62. Similarly, rails 746 are longitudinally aligned with rails 320 on supporting surface 302. The height of platform 740 and the height of vehicle 736 are such that the vehicle top surface supports rails 744,746 to be in horizontal alignment with the aforementioned rails 74,76 and 302 to allow movement of frame means 20 with outer positioning system 10 thereon and inner positioning system 12 between the workpiece and the transfer vehicle 736.

One form of drive means for vehicle 736 can comprise a rack (not shown) extending along one of the rails 738 and a motor-driven pinion (not shown) on vehicle 736. Appropriate stop means (not shown) are provided at the necessary location along path 732 in registry with the workpiece location. Vehicle 736 would be provided with suitable arrangements (not shown) for locking and securing frame means 20 and inner positioning system 12 thereon. The portion of the control system of FIG. 49 on the platform designated 694 would be installed on vehicle 736.

It is therefore apparent that the present invention accomplishes its intended objects. While an embodiment of the present invention has been described in detail, that is for the purpose of illustration, not limitation.

We claim:

1. A method of positioning tooling with respect to a curvilinear workpiece having a longitudinal axis comprising the steps of:
    a) providing carriage means movable along a supporting surface in spaced relation to said workpiece and in a direction substantially parallel to said longitudinal axis;
    b) providing extendable and retractable arm means having one end pivotally connected to said carriage means and extending from said carriage means toward said workpiece;
    c) providing head means containing said tooling and located on another end of said arm means;
    d) extending and retracting said arm means to move said tooling toward and away from said workpiece;
    e) moving said arm means about said one end and along a plane disposed substantially perpendicular to said longitudinal axis of said workpiece;
    f) moving said head means along a plane disposed substantially perpendicular to said longitudinal axis of said workpiece;

g) moving said head means along a plane disposed substantially parallel to said longitudinal axis of said workpiece; and h) rotating said head means about a longitudinal axis of the arm means.

2. A method of positioning tooling with respect to a curvilinear workpiece having a longitudinal axis, said workpiece being curved in a first direction extending along a plane substantially perpendicular to said longitudinal axis and being curved in a second direction extending along a plane substantially parallel to said longitudinal axis, the degree of curvature in said first direction being greater than the degree of curvature in said second direction, said method comprising the steps of:

a) providing carriage means movable along a supporting surface in spaced relation to said workpiece and in a direction substantially parallel to said longitudinal axis;

b) providing arm means having one end on said carriage means and extending from said carriage means toward said workpiece;

c) providing head means containing said tooling and located on another end of said arm means;

d) moving said head means toward and away from said workpiece for positioning said tooling in close proximity to said workpiece; and e) moving said arm means along said first direction about its curvature axis so as to move said tooling about said workpiece.

3. A method according to claim 2, further including moving said head means relative to said workpiece along a path in a plane disposed substantially perpendicular to said longitudinal axis of said workpiece.

4. A method according to claim 2, further including moving said head means relative to said workpiece along a path in a plane disposed substantially parallel to said longitudinal axis of said workpiece.

5. A method of positioning tooling with respect to a curvilinear workpiece having a longitudinal axis, said workpiece being curved in a first direction extending along a plane substantially perpendicular to said longitudinal axis and being curved in a second direction extending along a plane substantially parallel to said longitudinal axis, the degree of curvature in said first direction being greater than the degree of curvature in said second direction, said method comprising the steps of:

a) providing carriage means movable along a supporting surface in spaced relation to said workpiece and in a direction substantially parallel to said longitudinal axis;

b) providing arm means having one end on said carriage means and extending from said carriage means toward said workpiece;

c) providing head means containing said tooling and located on another end of said arm means;

d) moving said head means toward and away from said workpiece for positioning said tooling in close proximity to said workpiece;

e) moving said arm means along said first direction so as to move said tooling about said workpiece; and f) rotating said head means about a longitudinal axis of said arm means.

6. A method of positioning tooling with respect to a curvilinear workpiece having a longitudinal axis comprising the steps of:

a) providing frame means having a first portion extending about said workpiece in a direction substantially perpendicular to said longitudinal axis and having a second portion extending along said workpiece in a direction substantially parallel to said longitudinal axis;

b) providing head means containing said tooling and movably carried by said frame means;

c) moving said frame means longitudinally along said workpiece; and d) moving said head means along said second portion of said frame means and in a direction substantially parallel to said longitudinal axis so that when said frame means is stationed at any location along said longitudinal axis of said workpiece said head means and said tooling are moved along said second portion of said frame means and therefore along a corresponding portion of said workpiece in a direction substantially parallel to the longitudinal axis thereof.

7. A method according to claim 6, further including moving said head means toward and away from said workpiece.

8. A method according to claim 6, further including moving said head means about said workpiece along a path in a plane disposed substantially perpendicular to said longitudinal axis.

9. A method according to claim 8, further including moving said head means about said longitudinal axis and along a portion of said path.

10. A method according to claim 6, further including moving said head means about an axis disposed substantially perpendicular to said longitudinal axis.

11. A method according to claim 6, wherein said workpiece is curved in a direction along said longitudinal axis and further including moving said head means into position relative to said workpiece at locations along said workpiece as said frame means is moved longitudinally along said workpiece.

12. A method according to claim 6, wherein said head means carries a plurality of tools arranged in a row and further including moving said tools linearly along said row into and out of alignment with a work axis extending generally normal to said workpiece.

13. A method of positioning tooling with respect to a curvilinear workpiece having a longitudinal axis, said workpiece being curved in a first direction extending along a plane substantially perpendicular to said longitudinal axis and being curved in a direction extending along a plane substantially parallel to said longitudinal axis, the degree of curvature in said first direction being greater than the degree of curvature in said second direction, said method comprising the steps of:

a) providing frame means extending about said workpiece and including a portion curved in said first direction;

b) providing head means containing said tooling and movably carried by said frame means;

c) moving said frame means longitudinally along said workpiece;

d) moving said head means toward and away from said workpiece for positioning said tooling in close proximity to said workpiece as said frame means is moved longitudinally along said workpiece; and e) moving said head means about said workpiece and along said first direction.

14. A method according to claim 13, further including moving said head means about said longitudinal axis in conjunction with movement of said head means along said first direction.

15. A method according to claim 13, further including moving said head means along said second direction about an axis generally perpendicular to said longitudinal axis in conjunction with movement of said head means toward and away from said workpiece.

16. A method for positioning tooling with respect to a curvilinear workpiece having a longitudinal axis, said workpiece being curved in a first direction extending along a plane substantially perpendicular to said longitudinal axis and being curved in a second direction extending along a plane substantially parallel to said longitudinal axis, the degree of curvature in said first direction being greater than the degree of curvature in said second direction, said method comprising:

a) providing head means carrying said tooling;

b) moving said head means longitudinally along said workpiece and along substantially the entire length of said workpiece;

c) moving said head means in a direction substantially parallel to said longitudinal axis and along a minor portion of the length of said workpiece so that when said head means is stationed at any location along said longitudinal axis of said workpiece by said first means said head means is moved along said minor portion of the length of said workpiece;

d) moving said head means toward and away from said workpiece;

e) moving said head means about an axis disposed substantially perpendicular to said longitudinal axis of said workpiece;

f) moving said head means about said workpiece along a path corresponding to the curvature of said workpiece in said first direction and in a plane disposed substantially perpendicular to said longitudinal axis; and g) moving said head means about an axis disposed substantially parallel to the longitudinal axis of said workpiece.

17. A method according to claim 8, wherein said head means carries a plurality of tools arranged in a row and further including moving said tools linearly along said row into and out of alignment with a work axis extending generally normal to said workpiece.

18. A method of positioning tooling with respect to a curvilinear workpiece having a longitudinal axis comprising the steps of:

a) providing first carriage means supported on a surface spaced from said workpiece;

b) providing second carriage means movably carried by said first carriage means;

c) providing arm means having one end on said second carriage means and extending from said second carriage means toward said workpiece;

d) providing head means containing said tooling and located on another end of said arm means;

e) moving said first carriage means longitudinally along said workpiece; and f) moving said second carriage means along said first carriage means and in a direction substantially parallel to said longitudinal axis of said workpiece so that when said first carriage means is stationed at any location along said longitudinal axis of said workpiece said head means and said tooling are moved along said first carriage means and therefore along a corresponding portion of said workpiece and in a direction substantially parallel to the longitudinal axis thereof.

19. A method according to claim 18, further including moving said head means toward and away from said workpiece.

20. A method according to claim 18, further including moving said head means relative to said workpiece along a path in a plane disposed substantially perpendicular to said longitudinal axis of said workpiece.

21. A method according to claim 18, further including:

a) defining a pivot axis on said one end of said arm means in a direction substantially parallel to said longitudinal axis of said workpiece; and b) pivoting said arm means about said axis so that said arm means and said head means located on said another end of said arm means are moved along said path in said plane disposed substantially perpendicular to said longitudinal axis of said workpiece.

22. A method according to claim 21, further including moving said head means relative to said workpiece along a portion of said path in said plane disposed substantially perpendicular to said longitudinal axis of said workpiece.

23. A method according to claim 21, further including rotating said head means about a longitudinal axis of said arm means.

* * * * *